United States Patent
Ford et al.

(10) Patent No.: US 9,063,352 B2
(45) Date of Patent: Jun. 23, 2015

(54) TELESCOPIC CONTACT LENS

(75) Inventors: Joseph E. Ford, Solana Beach, CA (US); Eric Tremblay, Fruitvale (CA)

(73) Assignee: The Regents of the University of California, Oakland, CA (US)

(*) Notice: Subject to any disclaimer, the term of this patent is extended or adjusted under 35 U.S.C. 154(b) by 127 days.

(21) Appl. No.: 13/878,987

(22) PCT Filed: Oct. 11, 2011

(86) PCT No.: PCT/US2011/055850
§ 371 (c)(1),
(2), (4) Date: Jun. 24, 2013

(87) PCT Pub. No.: WO2012/051223
PCT Pub. Date: Apr. 19, 2012

(65) Prior Publication Data
US 2013/0265507 A1    Oct. 10, 2013

Related U.S. Application Data

(60) Provisional application No. 61/391,989, filed on Oct. 11, 2010.

(51) Int. Cl.
*G02C 7/04* (2006.01)
*G02C 7/08* (2006.01)
*G02C 7/10* (2006.01)
*G02B 17/08* (2006.01)
*G02B 23/06* (2006.01)

(52) U.S. Cl.
CPC ....... *G02C 7/044* (2013.01); *G02C 7/04* (2013.01); *G02C 7/088* (2013.01); *G02C 7/101* (2013.01); *G02B 17/0808* (2013.01); *G02B 23/06* (2013.01)

(58) Field of Classification Search
CPC ................................. G02C 7/04; G02C 7/049
USPC ........................................ 351/159.02, 159.35
See application file for complete search history.

(56) References Cited

U.S. PATENT DOCUMENTS

| 5,044,743 | A  |   | 9/1991  | Ting |
| 5,638,219 | A  | * | 6/1997  | Medina Puerta et al. ..... 359/729 |
| 5,980,040 | A  |   | 11/1999 | Xu et al. |
| 7,232,218 | B2 |   | 6/2007  | Morris et al. |
| 2006/0058874 | A1 |   | 3/2006 | Peli |
| 2007/0270947 | A1 |   | 11/2007 | Peyman |
| 2010/0091244 | A1 | * | 4/2010 | Volk .............................. 351/219 |

OTHER PUBLICATIONS

Peli, E. et al. "Image Enhancement for the Visually Impaired," Optical Engineering, 23(1):47-51, 1984.
Peli, E. et al. "Augmented Vision Head-Mounted Systems for Vision Impairments," the SID Int. Symposium, Soc Information Display, 2007.
Peli, E. et al. "In-The-Spectacle-Lens Telescopic Device," Journal of Biomedical Optics, 13(3):034027, 2008.

* cited by examiner

*Primary Examiner* — Darryl J Collins
(74) *Attorney, Agent, or Firm* — Perkins Coie LLP

(57) ABSTRACT

Techniques, systems and apparatus are described for implementing a telescopic contact lens. In one aspect, a telescopic contact lens includes an inner lens including optical apertures and aspheric reflectors, an outer lens of a biocompatible material, and a switching device that rapidly switches between normal and telescopic vision. The optical apertures of the inner lens includes a center aperture that allows light to pass through for normal vision and an annular aperture located on the periphery of the inner lens that allows light to enter for telescopic vision, The aspheric reflectors are configured between the annular aperture and the center aperture to reflect the light and magnify a visual image for telescopic vision.

41 Claims, 17 Drawing Sheets

Normal Visual Mode:
Central aperture is transparent

Telephoto Visual Mode:
Annular aperture is transparent

Normal Vision
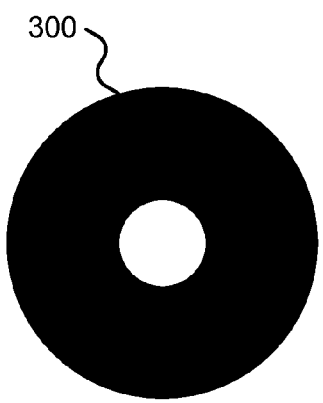
Transparent central aperture
Frontal view
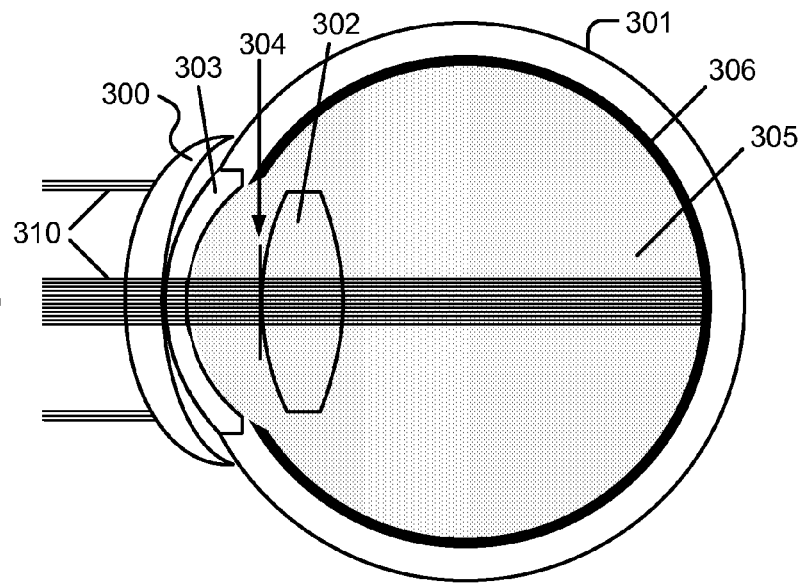
Cross sectional side view
FIG. 3A
Telescopic Vision
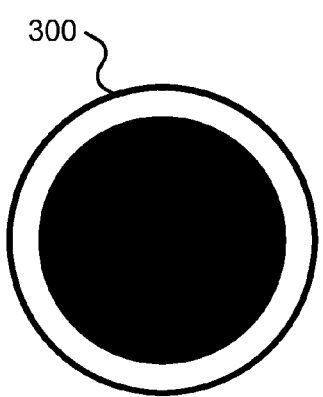
Transparent outer annular aperture
Frontal view
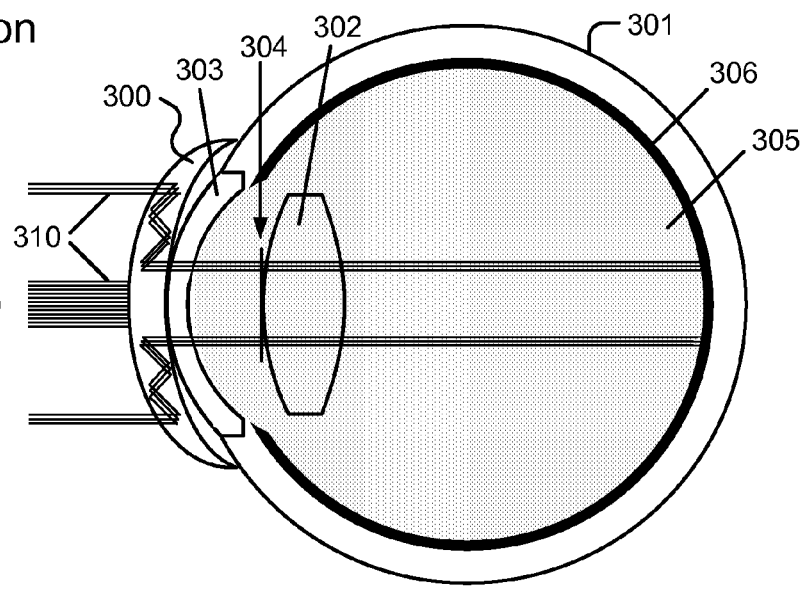
Cross sectional side view
FIG. 3B

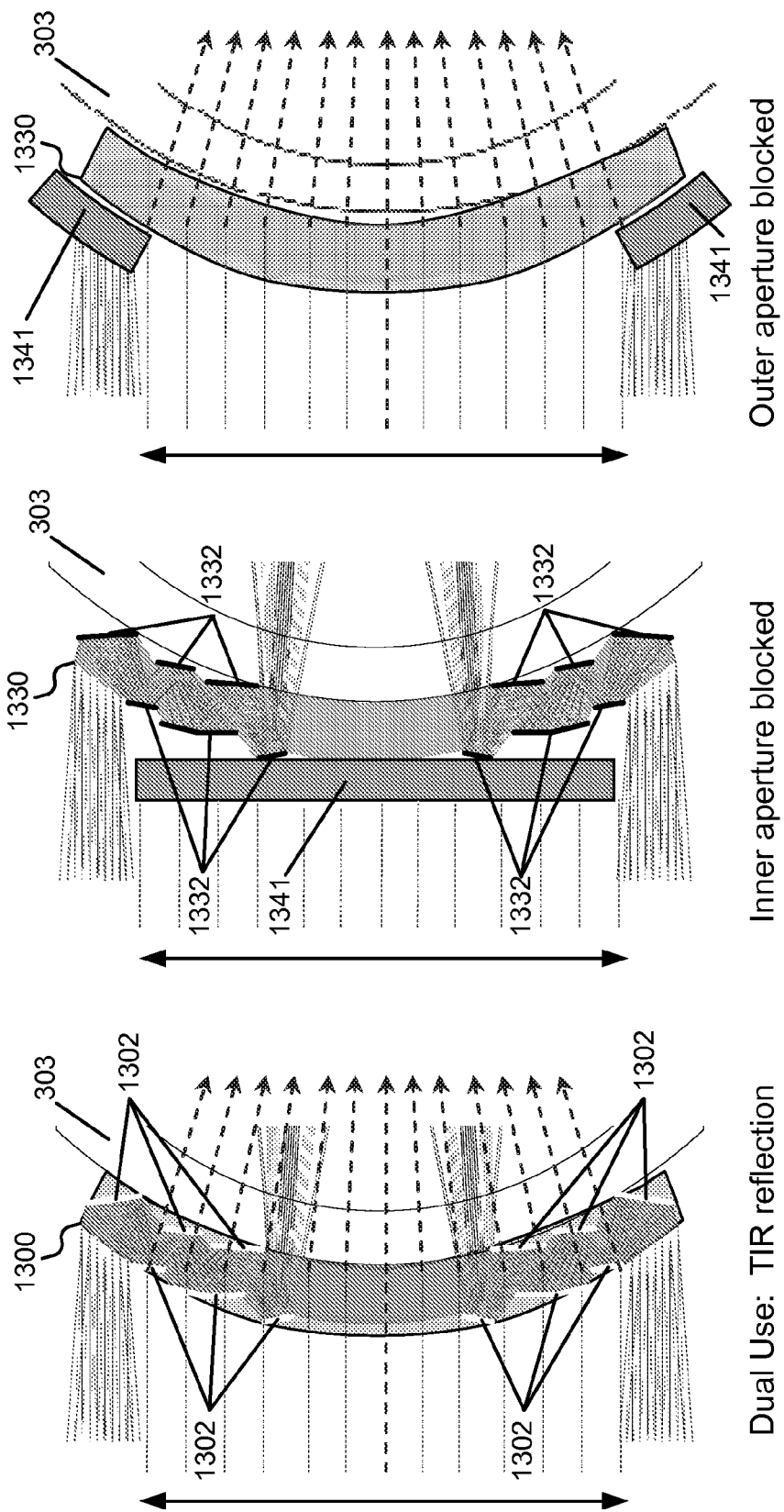
FIG. 13C  Outer aperture blocked
FIG. 13B  Inner aperture blocked
FIG. 13A  Dual Use: TIR reflection

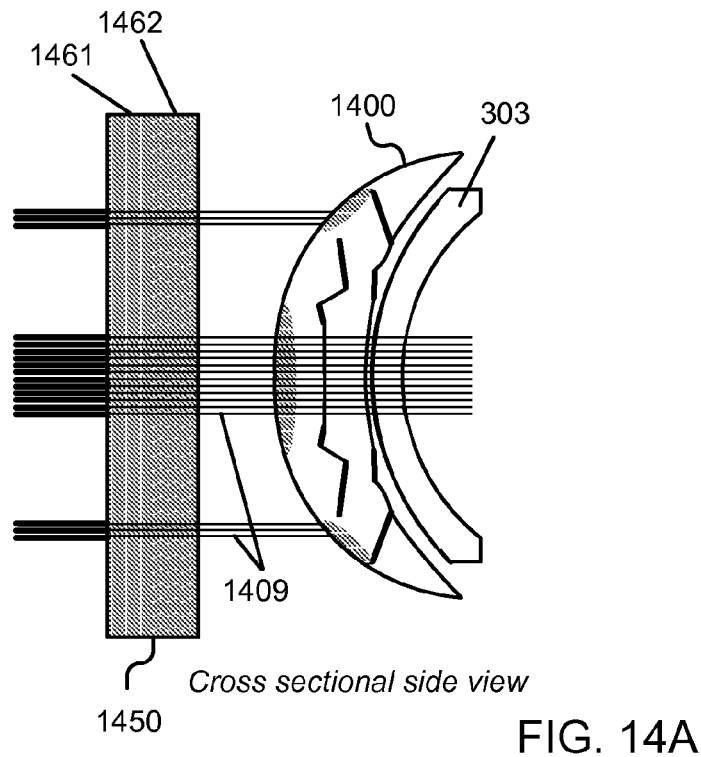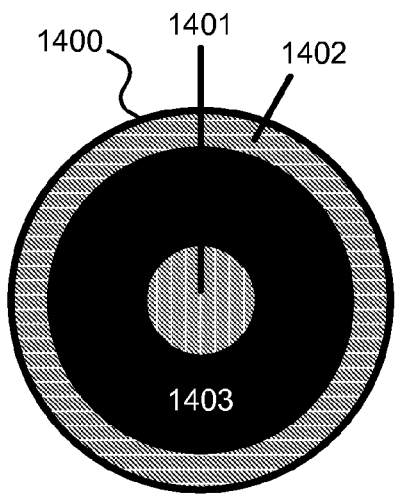
*Cross sectional side view*     *Frontal view*
FIG. 14A
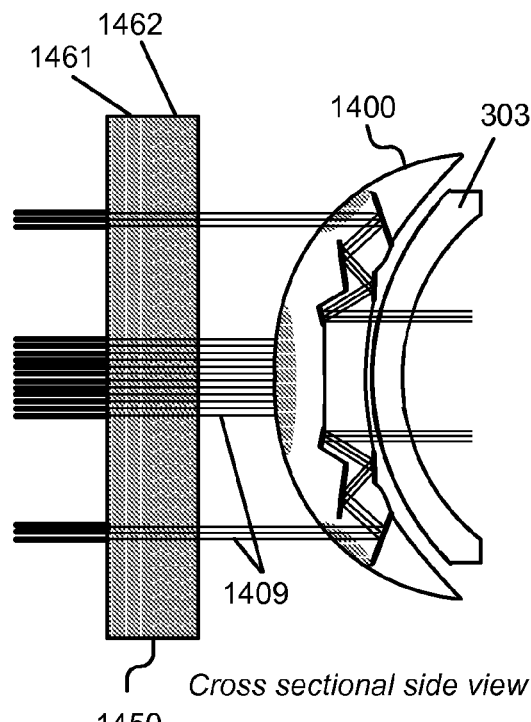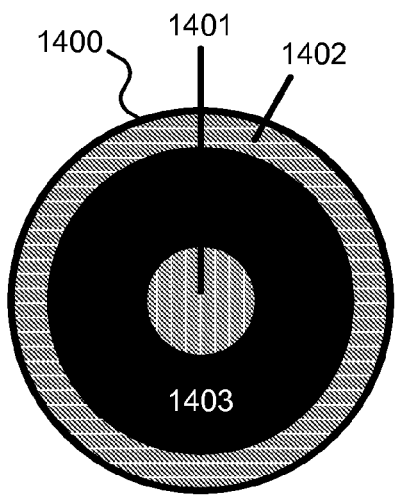
*Cross sectional side view*     *Frontal view*
FIG. 14B

TELESCOPIC CONTACT LENS

CROSS-REFERENCE TO RELATED APPLICATION

This patent document claims priority of U.S. Provisional Patent Application No. 61/391,989, filed Oct. 11, 2010, the entire disclosure of which is incorporated herein by reference for all purposes.

FEDERALLY SPONSORED RESEARCH OR DEVELOPMENT

The invention was made with government support under Grant No. HR0011-10-1-0005 awarded by the Defense Advanced Research Projects Agency (DARPA). The government has certain rights in the invention.

BACKGROUND

This patent document relates to optical lens technologies worn on the eye to provide desired vision.

Optical lenses for contact lenses can be designed to enhance human vision. Various hard contact lenses can be made in various ways including being injection molded or lathe-cut of "soft" materials such as hydrogels, or "hard" materials such as rigid gas permeable (RGP) polymers. The center thickness of some commercial RGP contact lenses varies according to the intended lens power and can be, for example, from 0.2 mm to 0.4 mm. Some RGP lenses have diameters of approximately 10 mm, with an optical zone of about 6 mm to 7 mm in the center. Special lenses (e.g., for movie costumes) can be much larger, up to 24 mm diameter.

Most optical lenses for eyeglasses and contact lenses have a single optical aperture to receive light and provide a single vision correction or multiple vision corrections.

SUMMARY

Techniques, devices and materials as described in this patent document can be used to implement contact lenses with at least two different optical apertures that provide different visions to an eye, respectively. One of the optical apertures can be used to, for example, provide magnified or telescopic vision capabilities.

In one aspect of the disclosed technology, a contact lens includes a lens assembly and a soft lens skirt. The lens assembly is structured to include a central aperture formed of a material capable of transmitting light through the central aperture to enter an eye behind the lens assembly as a first optical imaging device for forming images in the eye, an annular aperture separated from and enclosing the central aperture to receive light outside the central aperture, and an annular optical element coupled to the annular aperture to receive light from the annular aperture and to guide the received light along a folded optical path to enter the eye as a second optical imaging device for forming images in the eye that are optically different from images formed through the central aperture. The soft lens skirt is formed outside the lens assembly to form contact with the eye.

Various implementations of the above aspect can include one or more of the following features. The contact lens can include an aperture control mechanism that operates the central aperture and/or the annular aperture to receive light for forming images in the eye while shutting down the other aperture not to receive light. The contact lens can include a central aperture shutter, which is controlled by the aperture control mechanism to shut or open the central aperture, and an annular aperture shutter, which is controlled by the aperture control mechanism to shut or open the annular aperture. The central aperture shutter and the annular aperture shutter can include a spatial light modulator. The central aperture shutter and/or the annular aperture shutter can include a photochromic shutter. The central aperture shutter and/or the annular aperture shutter can include a liquid crystal switch. The contact lens can include a power source formed in the lens assembly to supply power to the central aperture shutter and the annular aperture shutter. The contact lens can include a blink-recognition element formed in the lens assembly to detect a blink of the eye, wherein the aperture control mechanism is coupled to the blink-recognition element to control, based on detected blinks, the central aperture shutter and the annular aperture shutter. The power source can be located in an area between the central aperture and the annular aperture. The annular optical element can include optical diffractive elements concentrically located in the annular optical element to form the folded optical path at each location on the annular optical element. The annular optical element can include optical reflectors concentrically located in the annular optical element to form the folded optical path at each location on the annular optical element. The annular optical element can include optical reflective and diffractive elements concentrically located in the annular optical element to form the folded optical path at each location on the annular optical element. The annular aperture and the annular optical element can form a telescope to magnify images formed in the eye to be greater than images formed through the central aperture.

In another aspect, a method for using a contact lens to form images in an eye includes using a central aperture of the contact lens as a first optical imaging device to form images in the eye in a first vision; using an annular aperture of the contact lens, that is separated from and encloses the central aperture, to receive light outside the central aperture, to guide the received light along a folded optical path to enter the eye as a second optical imaging device to form images in the eye in a second vision that is optically different from the first vision; and switching on and off the central aperture and the annular aperture, one aperture at a time, to form images in the first and second visions in the eye.

Various implementations of the above aspect can include one or more of the following features. The method can include the first vision and second vision having different image magnifications. The method can include the second vision being a telescope vision.

In another aspect of the disclosed technology, a contact lens includes a lens assembly including a central aperture, an annular aperture, a central aperture shutter, and annular aperture shutter, and an aperture control. The lens assembly is structured to include a central aperture formed of a material capable of transmitting light through the central aperture to enter an eye behind the lens assembly as a first optical imaging device for forming images in the eye. The annular aperture is formed in the lens assembly, that is separated from and encloses the central aperture, to receive light outside the central aperture, and to guide the received light along a folded optical path to enter the eye as a second optical imaging device for forming images in the eye that are optically different from images formed through the central aperture. The central aperture shutter shuts or opens the central aperture. The annular aperture shutter shuts or opens the annular aperture. The aperture control operates one of the central aperture and the annular aperture to receive light for forming images in the eye while shutting down the other one of the central aperture and the annular aperture not to receive light.

Various implementations of the above aspect can include one or more of the following features. The contact lens can include a power source formed in the lens assembly to supply power for operating the contact lens. The contact lens can include a blink-recognition element formed in the lens assembly to detect a blink of the eye, wherein the aperture control is coupled to the blink-recognition element to control, based on detected blinks, the central aperture shutter and the annular aperture shutter. The power source can be located in an area between the central aperture and the annular aperture. The power source can be a photovoltaic power source that converts light into electrical power. The contact lens can include a wink-recognition element formed in the lens assembly to detect a wink of the eye, wherein the aperture control is coupled to the wink-recognition element to control, based on detected winks, the central aperture shutter and the annular aperture shutter.

In another aspect of the disclosed technology, a contact lens includes a lens assembly and a soft lens skirt. The lens assembly is structured to include a central aperture formed of a material capable of transmitting light through the central aperture to enter an eye behind the lens assembly as a first optical imaging device for forming images in the eye, an annular aperture separated from and enclosing the central aperture to receive light outside the central aperture, and an annular optical element coupled to the annular aperture to receive light from the annular aperture and to guide the received light along a folded optical path to enter the eye as a second optical imaging device for forming images in the eye that are optically different from images formed through the central aperture. The soft lens skirt is formed outside the lens assembly to form contact with the eye. The contact lens can be combined with eyeglasses that guides light transmission into the lens. The eyeglasses can include a polarized lens assembly structured to include a polarized lens of a particular polarization made of a switchable polarizing material and a polarization control mechanism coupled to the polarized lens that controls an orientation of the particular polarization of the polarized lens. The contact lens can further include a central aperture polarizer that is of a first polarization and an annular aperture polarizer that is of a second polarization, wherein the polarized assembly lens filters light to guide the light to the central aperture or the annular aperture of the lens. The polarization control mechanism can determine the particular polarization to match the first polarization or the second polarization. The particular polarization can be orthogonal to the first polarization, thereby blocking light from transmitting through the central aperture. The particular polarization can be orthogonal to the second polarization, thereby blocking light from transmitting through the annular aperture. The switchable polarizing material can include at least one of liquid crystals, elecro-absorptive electrochromic material, and electro-reflective electrochromic mirrors.

In another aspect of the disclosed technology, a contact lens includes a lens assembly and a soft lens skirt. The lens assembly is structured to include a central aperture formed of a material capable of transmitting light through the central aperture to enter an eye behind the lens assembly as a first optical imaging device for forming images in the eye, an annular aperture separated from and enclosing the central aperture to receive light outside the central aperture, and an annular optical element coupled to the annular aperture to receive light from the annular aperture and to guide the received light along a folded optical path to enter the eye as a second optical imaging device for forming images in the eye that are optically different from images formed through the central aperture. The soft lens skirt is formed outside the lens assembly to form contact with the eye. The contact lens can be combined with eyeglasses that guides light transmission into the lens. The eyeglasses that guides light transmission into the lens can include a polarized lens assembly structured to include a polarized lens of a particular polarization, and the contact lens can further include a central aperture polarizer made of a switchable polarizing material that is of a first polarization, an annular aperture polarizer made of a switchable polarizing material that is of a second polarization, and an aperture control mechanism coupled to the central aperture polarizer and the annular aperture polarizer that controls an orientation of at least one of the first polarization and the second polarization. The polarized assembly lens can filter light to guide the light to the central aperture or the annular aperture of the lens at the particular polarization. The aperture control mechanism can determine the first polarization to match the particular polarization of the polarized lens and the second polarization to be orthogonal to the particular polarization of the polarized lens, thereby blocking light from transmitting through the annular aperture. The aperture control mechanism can determine the second polarization to match the particular polarization of the polarized lens and the first polarization to be orthogonal to the particular polarization of the polarized lens, thereby blocking light from transmitting through the central aperture. The switchable polarizing material can include at least one of liquid crystals, elecro-absorptive electrochromic material, and electro-reflective electrochromic mirrors.

In another aspect of the disclosed technology, a contact lens includes an inner lens and a switching device. The inner lens includes two or more optical apertures and optical reflectors, wherein the two or more optical apertures include a central optical aperture located in the center of the inner lens that receives light and directs received light onto a central region of a retina of an eye for normal vision and an annular optical aperture located on a periphery of the inner lens that receives light and directs received light along a folded optical path formed by the optical reflectors to magnify an image in the received light onto a peripheral region of the retina for a telescopic vision, and wherein the optical reflectors are arranged in a region between the annular optical aperture and the central optical aperture to reflect the received light from one reflector to another along the folded optical path that is separated from an optical path of the received light from the central optical aperture. The switching device that is located on the exterior of the inner lens between the two or more optical apertures that switches between normal and telescopic vision.

Various implementations of the above aspect can include one or more of the following features. The contact lens can include having the two or more optical apertures being concentric. The contact lens can include having the plurality of aspheric reflectors being concentric. The switching device can include a conformal spatial light modulator, which can include at least one of a photochromic shutter and a liquid crystal switch that are spatially shaped to match the areas of the two or more optical aperture. The switching device can be powered and controlled using light and photovoltaic cells. The inner lens can further include diffractive optical elements (DOE) to control chromatic aberrations.

In another aspect of the disclosed technology, a contact lens includes a lens assembly and a soft lens skirt. The lens assembly is structured to include a central aperture formed of a material capable of transmitting light through the central aperture to enter an eye behind the lens assembly as a first optical imaging device for forming images in the eye, an annular aperture separated from and enclosing the central aperture to receive light outside the central aperture, and an annular optical element coupled to the annular aperture to receive light from the annular aperture and to guide the received light along a folded optical path to enter the eye as a second optical imaging device for forming images in the eye that are optically different from images formed through the central aperture. The soft lens skirt is formed outside the lens assembly to form contact with the eye. The lens assembly is made of the same material as the soft lens skirt.

In another aspect of the disclosed technology, a contact lens includes concentric reflective optical surfaces that provide a vision path through an annular input aperture, wherein the concentric reflective optical surfaces are internal surfaces to a smooth outer structure, and wherein the concentric reflective surfaces lie on a first material embedded within a second material, and wherein the combination of reflections and refractions through the first and second materials provide a substantially color independent visual magnification.

In another aspect of the disclosed technology, a contact lens includes concentric reflective optical surfaces that provide a vision path through an annular input aperture, wherein the concentric reflective optical surfaces are internal surfaces to a smooth outer structure, and wherein the concentric reflective optical surfaces lie on the internal surfaces of a substantially hollow volume within the smooth outer structure, and wherein the combination of refractive and reflective surfaces provide a substantially color independent visual magnification.

The disclosed technology can provide one or more of the following advantages. The telescopic contact lens can allow for fast, hands-free switching between the normal vision and instant, low-magnification telescopic vision. Full-color telescopic imaging can be co-axially aligned with normal wide angle imaging with the eye, and aiming or pointing can be accomplished via natural eye and/or head movement. The disclosed technology can be configured to yield a combination of normal and magnified vision, magnified vision only, or normal vision only. The telescopic contact lens can provide a person with a natural enhancement to natural vision that has substantially no weight or bulk, in comparison to a hand-held or glasses-mounted telescopic vision aid. The telescopic contact lens can provide a person with diminished vision, e.g., due to ophthalmic illness or degenerative condition, with a non-surgical aid to enhance vision and remedy visual problems. For example, the disclosed technology can provide visual aid for people suffering from macular degeneration (estimated several million people in the US alone), as well as aid in recreational sporting activities (e.g., hunting, watching and participating in competitive sports, etc.).

BRIEF DESCRIPTION OF THE DRAWINGS

FIGS. 3A-3B show optical paths in normal and telescopic visual modes through an exemplary telescopic contact lens.

FIGS. 13A-13C show an exemplary telescopic contact lens with dual-use apertures using total internal reflection (TIR) mirrors.

FIGS. 14A-14B show normal and telescopic visual modes of an exemplary telescopic contact lens aided by switchable-polarizing lenses of eyeglasses.

Like reference symbols and designations in the various drawings indicate like elements.

DETAILED DESCRIPTION

Figure 1:
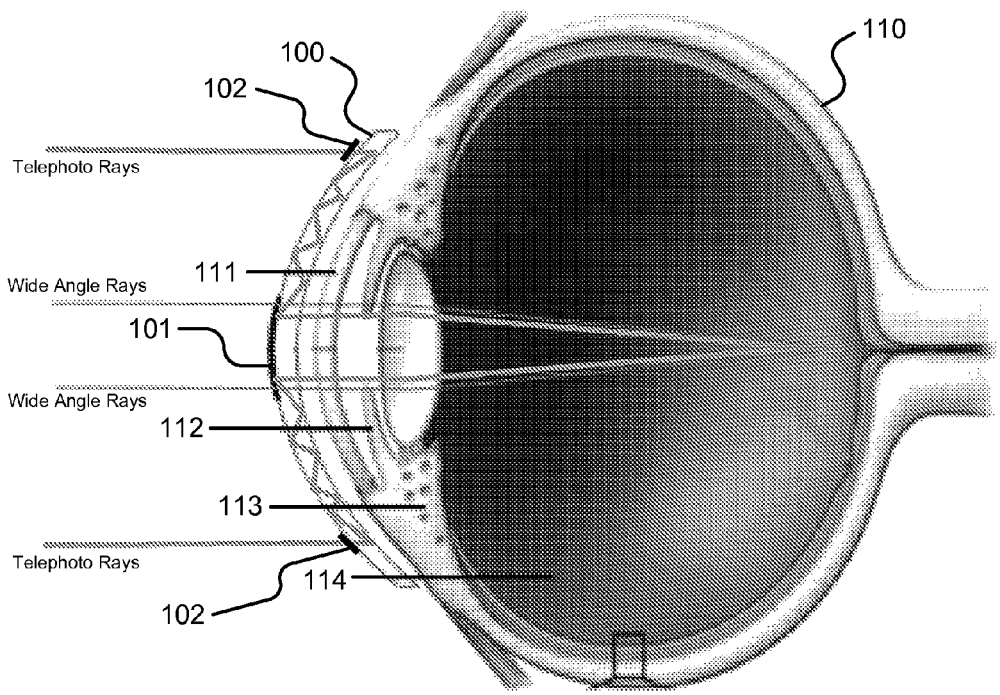
FIG. 1 shows an exemplary telescopic contact lens worn over an eye.

The techniques, devices and materials as described in this patent document can be used to implement a dual-vision contact lens worn in front of an eye to provide a first vision using light collected from the central region of the eye and a second telescopic vision with a magnified image using light collected from the non-central (e.g., peripheral) region of the eye. The first vision in the central region of the eye can be a vision that is naturally formed by the human eye without modification or enhancement by the contact lens, or alternatively enhanced or modified by a prescription lens located in the central part of the contact lens. The second telescopic vision is formed by a completely different optical imaging system using a folded optical path in such a contact lens to provide the magnified images for the telescopic vision.

Magnified vision can be useful or beneficial for various applications, including, for example, recreational sports, military field operations, and biomedical treatments. For example, some types of ophthalmic illnesses can require magnification to maintain some level of visual acuity, and thus visual aids that provide magnified vision can address such illnesses. Examples of visual aids include optics worn as external eyeglasses or contact lenses, head-mounted optical vision devices and optics surgically inserted into the eye.

Magnified vision technologies can date back to many centuries ago and one example is the binoculars. Binoculars and other optics worn as glasses or head-mounted optics can require motion of the head to orient the lenses towards an object of interest. High-performance binoculars, which tend to use large optical magnification with high brightness, can be bulky and heavy, e.g., conventional 10×50 compact binoculars weigh well over two pounds. Also, binoculars can have limited visible field of view, forcing the user to hold the binoculars while panning across the field. For example, some commercial 10×50 binoculars have a 6.3° field of vision (FOV). In comparison, the field for peripheral vision of a human eye is close to 180°. This limited field of vision of conventional binoculars can severely limit the performance and uses of the binoculars. With binoculars, a soldier can have clear vision of a small field, such as an object in a distance, but a threat outside the binoculars' narrow field can be invisible. Should a situation require constant magnified vision, full-time use of binoculars for magnification can be difficult, if not impossible, to maintain. In addition, providing magnification to only one eye can sacrifice depth perception. With unaided vision, a slight motion anywhere within the visual field can be visible to the soldier who can quickly respond and look at the potential threat. Without magnification, it can be difficult for the solider to have a good observation of the potential threat in a distance and this may render it difficult to respond to the potential threat. Hence, it is desirable to have optical vision systems that provide a magnified vision while still maintaining a large field of view.

Technical features for contact lenses described in this patent document can be implemented in ways that, in one aspect, combine the large field of view and convenience of natural vision with the acuity of binoculars based on the dual vision designs with two optical apertures and two optical imaging systems. The disclosed technology can include a contact lens that can incorporate optical elements that act a telescope to provide a magnified vision of a normally viewed scene. The optical elements for producing the magnified vision can use a combination of reflective, refractive, and/or diffractive surfaces. Examples provided here use reflectors by either optical reflectors and/or optical diffraction elements. In addition to the magnified vision, the disclosed technology can also provide a normal view by using a different optical imaging system that is separate from the telescope. This combination of a telescope view in one optical imaging system and a normal view by using another optical imagining system in one contact lens is a "hybrid" contact lens design that has two different and independent optical apertures. In one implementation, for example, such a hybrid contact lens can combine a rigid gas permeable (RGP) center with a soft outer biocompatible skirt for user comfort. Several embodiments of a telescopic contact lens and methods to fabricate and implement the telescopic contact lens are described herein.

The telescopic contact lens technology described herein can be suitable for biological environments by including a folded optical design that can be adapted to the requirements of an afocal telescope and incorporated into a biocompatible medium, e.g., a soft outer skirt of a contact lens. The described exemplary telescopic contact lenses are unobtrusive and can be worn just like a conventional retinal contact lens, or a larger diameter scleral contact lens. The dimensions of an exemplary telescopic contact lens can be determined by the maximum diameter and thickness which is comfortable for the wearer and can also facilitate operation of the optical element. For example, a lens with an outer diameter of about 10 mm to 15 mm and a thickness of a 0.4 mm in the center is generally considered to be able to provide a comfortable wear. Larger outer diameters, e.g., up to 24 mm, and thicker center (approximately 1 mm) may also be used in implementing the disclosed contact lenses.

Under the designs in the examples provided here, a contact lens can include a lens assembly structured to include a central aperture formed of a material capable of transmitting light through the central aperture to enter an eye behind the lens assembly as a first optical imaging device for forming images in the eye in a first vision. A second annular aperture separated from the central optical aperture is provided to enclose the central aperture to receive light outside the central aperture. In connection with the annular optical aperture, an annular optical element is coupled to the annular aperture to receive light from the annular aperture and to guide the received light along a folded optical path to enter the eye as a second optical imaging device for forming images in the eye in a second vision that is optically different from the first vision formed through the central aperture. As illustrated in the examples below, the central aperture can be unobstructed and fully open to receive incident light incident upon the central aperture when forming the images. The annular aperture is separated from the central aperture to receive light, which is peripheral to and falls outside the central aperture, so that the operations of the annular aperture and the central aperture are completely separated by operating on different portions of the incident light received by the contact lens. The images formed via the central aperture provide an unobstructed view that may be enhanced or modified via the lens prescription in the central area and feels natural to the person who wears this contact lens, while the images formed via the annular aperture can provide a magnified telescopic view without hindering the unobstructed view via the central aperture. This design of the first optical imaging via the central aperture and a second telescopic imaging via the annular aperture allows versatile uses of such hybrid contact lenses.

Notably, the presence of the two visions produced by the hybrid contact lens may be controlled by presenting only one vision to the eye at a time and by switching between the two visions to allow the person who wears the hybrid contact lens to control what vision the person desires. Technique and mechanisms for switching on and off the central aperture and the annular aperture are provided in this document, including switching devices located outside the hybrid contact lenses and switching devices located inside the hybrid contact lenses.

FIG. 1 shows an exemplary telescopic contact lens (100) that is worn over the cornea (111) of an eye (110). Some anatomical structures of eye (110) are featured in FIG. 1, such as the iris (112), trabecular meshwork (113), and vitreous (114). Telescopic contact lens (100) can include an inner central aperture (101) and an outer annular aperture (102). The central aperture (101) can allow all light (including wide angle rays) that can follow a first optical path and enter the pupil formed by iris (112) to be seen as normal vision (an unaltered natural view). The annular aperture (102) can provide a second optical path which also allows light to enter the eye (110) through the pupil formed by iris (112) to be seen as telescopic (magnified) vision. Light that enters the annular aperture (102) can be reflected (or "folded") within the telescopic contact lens (100) to form a folded optical path that can result in a modified enhanced view, e.g., magnified view. The modified enhanced view can produce magnified vision, also referred to as telescopic vision. Telescopic vision produces visual images to the eye (110) that are different than visual images produced by light traveling through the central aperture (101). The telescopic (magnified) vision has a narrower field of view than normal vision but does not include any obstructive blind spots. The telescopic contact lens (100) can be configured such that the unobstructed view through the central aperture (101) is a modified prescription view, e.g., such as a conventional prescription contact lens to correct near-sightedness or far-sightedness, and the optical surfaces used in the outer path also corrects for near-sightedness or far-sightedness, so that both vision modes are usable. Visual modes (e.g., normal visual mode and telescopic visual modes) of the telescopic contact lens (100) can be fixed (e.g., constant) or switchable between telescopic and normal vision, in response to a user's preference.

Figure 2:
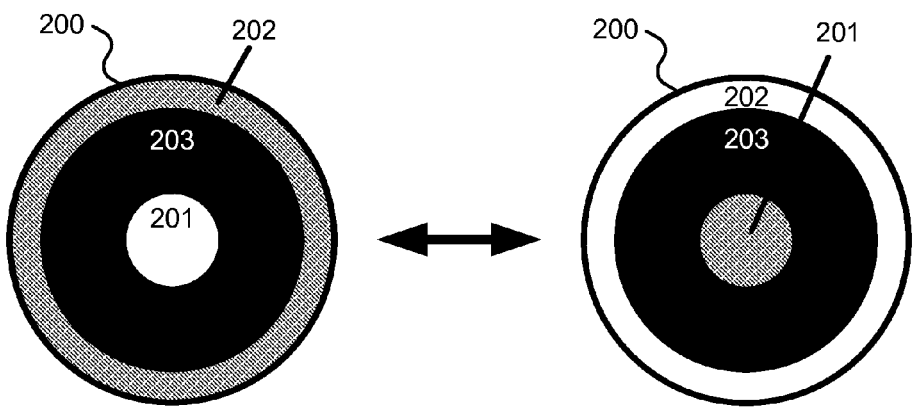
FIG. 2 shows an exemplary telescopic contact lens switching between normal and telescopic visual modes.

FIG. 2 shows a planar view of an exemplary telescopic contact lens (200) showing switching operations between the central aperture and the annular aperture of the contact lens design described in FIG. 1 in a frontal plane view that would face an object to be viewed by a user wearing telescopic contact lens (200). In one example of switching between telescopic and normal vision, telescopic contact lens (200) can exhibit binary transmission switching between normal visual mode and telescopic visual mode, in which central aperture (201) and outer annular aperture (202) are switchable between opaque and transparent apertures on their frontal sides. In normal visual mode, telescopic contact lens (200) can be configured to block light from passing through the annular aperture (202) while permitting light to pass through the central aperture (201). This exemplary light transmission setting is referred to as normal visual mode because no magnification of a perceived image occurs, and light passing through telescopic contact lens (200) (e.g., through the central aperture (201)) that enters a user's eye is substantially the same light as that which would enter a user's eye without wearing telescopic contact lens (200), e.g., providing substantially the same visual intensity, field of view, etc. In telescopic visual mode, telescopic contact lens (200) can be configured to block light from passing through the central aperture (201) while permitting light to pass through the annular aperture (202). This setting is referred to as telescopic visual mode because a user's perceived visual image can be magnified. For example, in telescopic visual mode, light passing through telescopic contact lens (200) (e.g., through the outer annular aperture (202)) can be folded using optical elements placed within an interior region (203) between the two apertures and transmit toward the user's eye through the back side (e.g., eye side) of central aperture (201) that is not blocked.

In addition to binary switching between normal visual mode and telescopic visual mode, telescopic contact lens (200) can passively permit light to enter both apertures (central aperture 221 and outer annular aperture 222), which can provide a combination of telescopic and normal vision. The exemplary telescopic contact lenses can be configured to yield a combination of normal and magnified vision, magnified vision only, or normal vision only, and can be configured for fast, hands-free switching between the normal vision and instant, low-magnification telescopic vision.

FIGS. 3A and 3B further demonstrate the optical path of light in normal and telescopic visual modes by presenting a cross-sectional side view of an exemplary telescopic contact lens (300) worn over an eye (301). An exemplary illustration of eye (301) is shown in FIGS. 3A and 3B and other subsequent figures to demonstrate different embodiments and implementations of the telescopic contact lens technology. The exemplary illustration of eye (301) shows some anatomical structures or features of an eye, including a lens (302), a cornea (303), a pupil (304), a vitreous body (305), and a curved retinal surface (306). FIG. 3A shows the exemplary telescopic contact lens (300) in contact with the front of eye (301), which can be placed in normal visual mode to permit light (310) to transmit through its central aperture while blocking light from entering its annular aperture. The transparent central aperture and opaque outer annular aperture are featured in a frontal view of exemplary normal visual mode. FIG. 3B shows the exemplary telescopic contact lens (300), which is placed in telescopic visual mode to permit light (310) to enter its outer annular aperture, reflect along optical elements (e.g., four concentric aspheric reflectors) within an interior region between the annular and central apertures, and pass through the back surface of its central aperture toward the eye. The transparent outer annular aperture and opaque central aperture are featured in a frontal view of this exemplary telescopic visual mode.

Figure 4A:
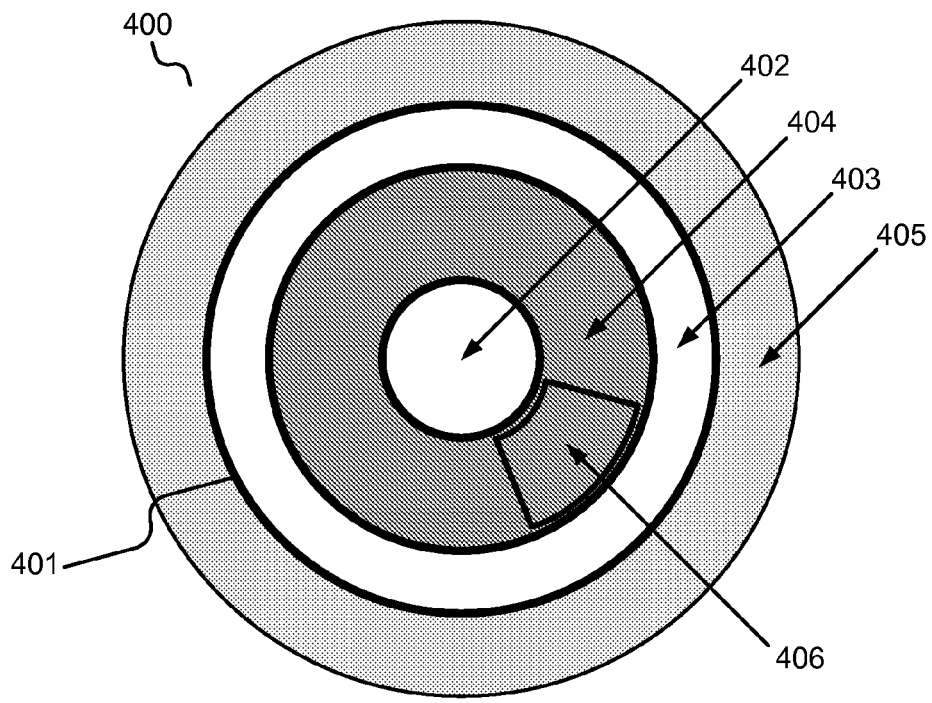
FIGS. 4A-4B show frontal and side planar views of an exemplary telescopic contact lens.

A schematic of an exemplary embodiment of a telescopic contact lens is shown in FIG. 4A. FIG. 4A shows a planar view of an exemplary telescopic contact lens (400), e.g., a frontal side that would face an object to be viewed by a user wearing telescopic contact lens (400). Telescopic contact lens (400) can include one region that includes one or more optical elements, which can be referred to as an optical region (401). For example, optical region (401) can include optical elements that have two concentric apertures, e.g., a central aperture (402) located in the center of optical region (401) and an annular aperture (403) located along the periphery of optical region (401). Optical region (401) can include an interior region (404) between the two concentric apertures. Telescopic contact lens (400) can incorporate optical region (401) with an outer, biocompatible lens (405). Optical region (401) can be positioned in the center of the outer lens (405) such that it would reside over the corneal region of an eye when worn by a user.

The central aperture (402), also referred to as the normal aperture, can be configured to permit light to pass through normally without modification of the appearance of a visual image. The annular aperture (403), also referred to as the telescopic aperture, can be configured to permit light to enter the annular aperture (403), reflect through the interior region (404), and exit through the back side of the central aperture (402) to magnify the appearance of a visual image. Light that enters the annular aperture (403) is reflected through the interior region (404), e.g., between the interior reflective surfaces of concentric aspheric reflectors that are configured to create a magnified visual image.

In one aspect, telescopic contact lens (400) can include four concentric aspheric reflectors such that it is configured as a 4-folded lens. In another aspect, telescopic contact lens (400) can include six concentric aspheric reflectors such that it is configured as a 6-folded lens. These exemplary 4-folded and 6-folded lenses can enable telescopic contact lens (400) to achieve telescopic magnification without a corresponding increase in the physical thickness of optical region (401) by reflecting the optical path multiple times with concentric aspheric reflectors, for example, which can constrain the optical propagation to occur within a thin optical element. Optical region (401) can include all-reflective folded concentric reflectors that can minimize chromatic aberration. All-reflective reflectors can block light from passing through the interior region (404) between outer annular aperture (403) and central aperture (402) of telescopic contact lens (400) in a manner that does not create a blind spot in the user's vision. Additionally, optical region (401) can include total internal reflection (TIR) reflectors (e.g., TIR mirrors) that permit light to pass through in the interior region (404) of telephoto contact lens (400), which is discussed in further detail later in this document.

Figure 4B:
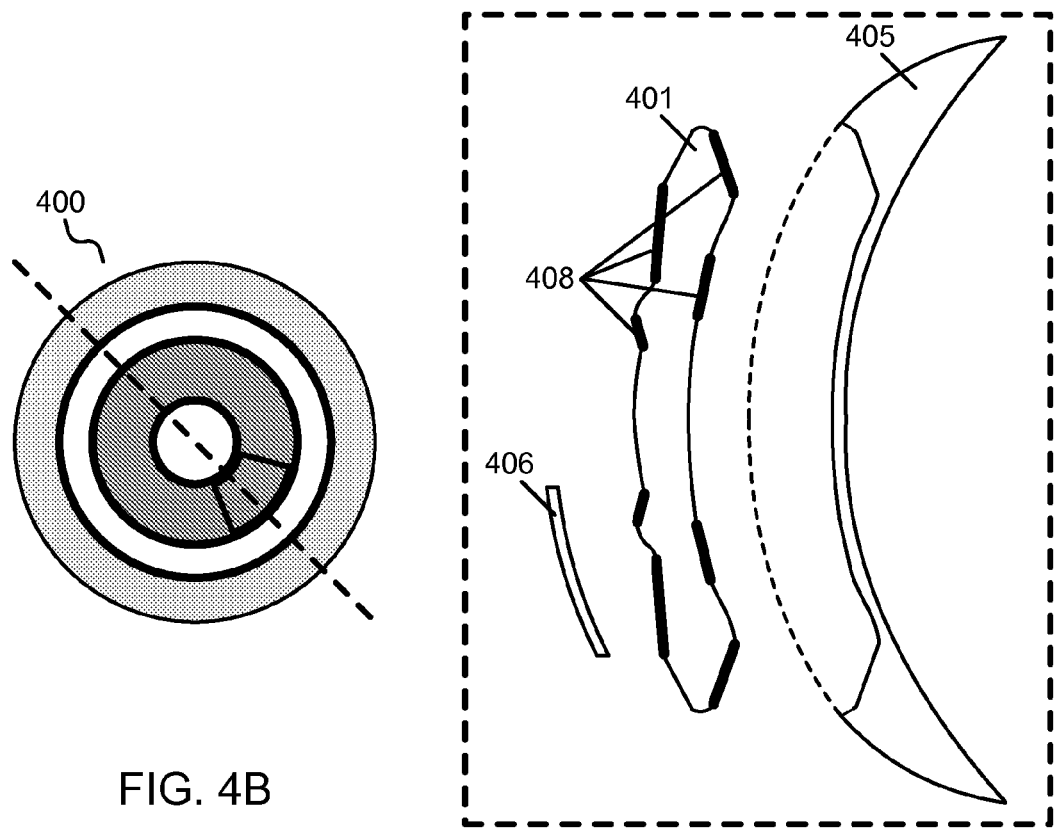

In some aspects of the exemplary telescopic contact lens (400), the optical region (401) can include an electrical or mechanical control switch (406) that can switch between the normal aperture (402) and telescopic aperture (403), e.g., an electrical circuit that can rapidly switching between near and telescopic vision. Control switch (406) can be located along the interior region (404), e.g., between the two optical apertures above the fold mirrors of the optical region (401). FIG. 4B shows a side plane cross-sectional view of the exemplary telescopic contact lens (400), in which exemplary sections including the optical region (401), the outer lens (405), and switch (406) are illustratively separated. The exemplary telescopic contact lens (400) in FIG. 4B shows four concentric aspheric reflectors (408) such that it is configured as a 4-folded lens. Switch (406) can include one or more switching technologies. Switching technologies can include aperture blocking, light absorption within optical elements, or other switching technologies to be discussed in this patent document.

In an example of an aperture blocking switching technology, telescopic contact lens (400) can include a conformal spatial light modulator (SLM), such as a photochromic (PC) shutter, electrochromic (EC) shutter, or liquid crystal (LC) switch, which can be spatially shaped to match the two aperture areas. Switch (406) can be powered and controlled by using organic photovoltaic (PV) cells that can cover the exterior of the interior region (404). Also, switch (406) can be powered by a radio frequency (RF) transmitted or capacitively-coupled electrical source. PV cells can offer a low current power supply driven by the same light present in the visual scene (and incident from a very wide range of angles). In one aspect of the switch (406), PV cells also offer a user control interface, e.g., by patterned blinking. Since the current generated by the PV cell can be interrupted briefly each time the user blinks, transistor logic can be integrated with the PV cell to recognize a brief sequence and switch between telescopic and normal visual modes. When the telescopic visual mode is switched "on" (and normal visual mode switched "off"), a PC, EC or LC shutter can cover the central aperture (402); and when the normal visual mode is switched on (and telescopic visual mode switched "off"), a PC, EC or LC shutter can cover the annular aperture (403). The switch (406) can be configured to also include switching both the telescopic and normal visual modes "on" and "off". Additionally, the PC, EC or LC shutters can be configured to allow for complete blocking of light rays in normal and/or telescopic visual modes (e.g., fully opaque) or varying degrees of translucence, e.g., ranging between 0% transparency to 100% transparency.

In other aspects, the exemplary telescopic contact lens (400) may not include switch (406), as it may be possible for the user to acclimate to the overlay of two visual fields, making the switching unnecessary. The human visual cortex provides advanced information processing, for example by eliminating the blind spot where the optic nerve displaces the retina, or by providing an apparently wide field of optical resolution much higher than the actual raw optical resolution of the eye. Based on these phenomena, switching might not be necessary for a user to be able to concentrate selectively on either the normal or telescopic vision information.

Figure 5:
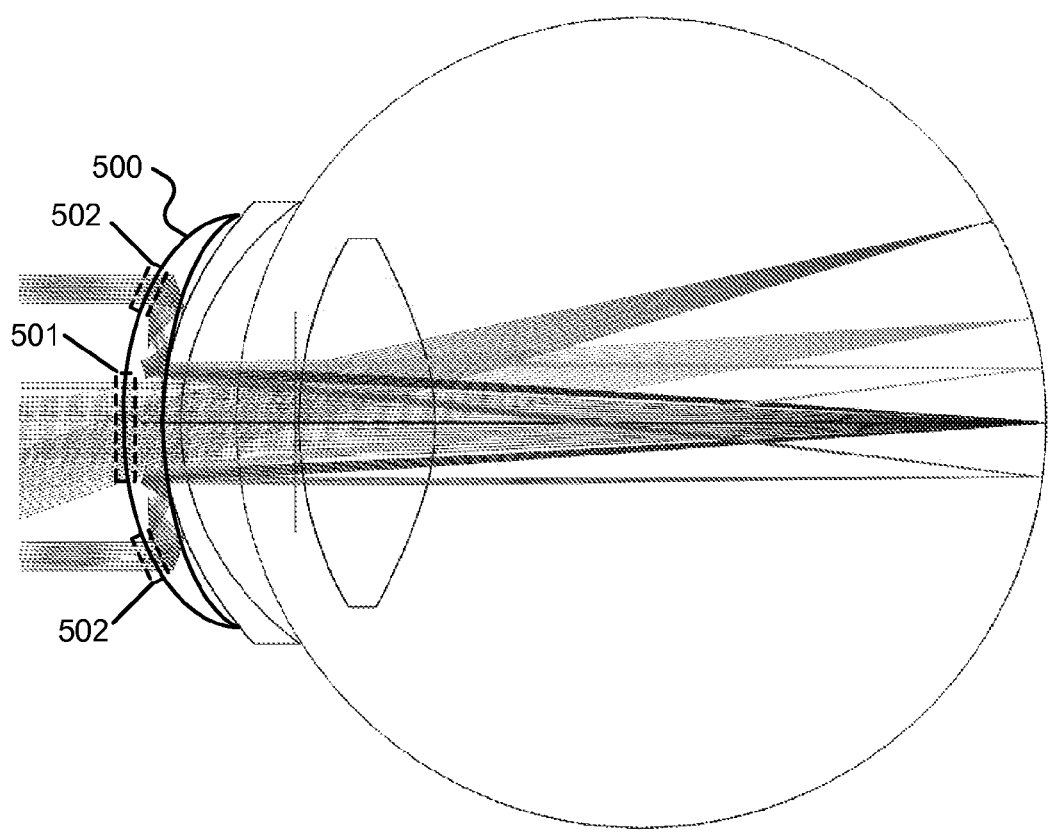
FIG. 5 shows optical paths in an exemplary passive telescopic contact lens.

Accordingly, in some aspects of an exemplary telescopic contact lens, 'passive' optics for both telescopic and normal vision can be implemented. In one example shown in FIG. 5, telescopic contact lens (500) can allow simultaneous superimposed telescopic and normal visual images from light entering the central aperture (501) and annular aperture (502). Simultaneous superimposed images can be provided by dual focal length images to the user's visual cortex, in which a user can distinguish (after a 'learning interval' in some cases). In another example, the telescopic path can be effectively blocked by 'squinting' or other pupil contraction blocking Selectively blocking the annular aperture by partially closing eyelids (e.g., a user 'squinting') or contracted pupil can effectively disable the telescopic functionality of the telescopic contact lens (500), making the telescopic image easy for the user to ignore, e.g., squinting to allow a 3 mm length in the exposed annular aperture of an exemplary telescopic contact lens that includes a 4-folded optic (four concentric aspheric reflectors) can cut the power by 85% and reduce the effective F/# from F/7.9 to F 19.7, resulting in 6× brighter central aperture image.

Figure 6A:
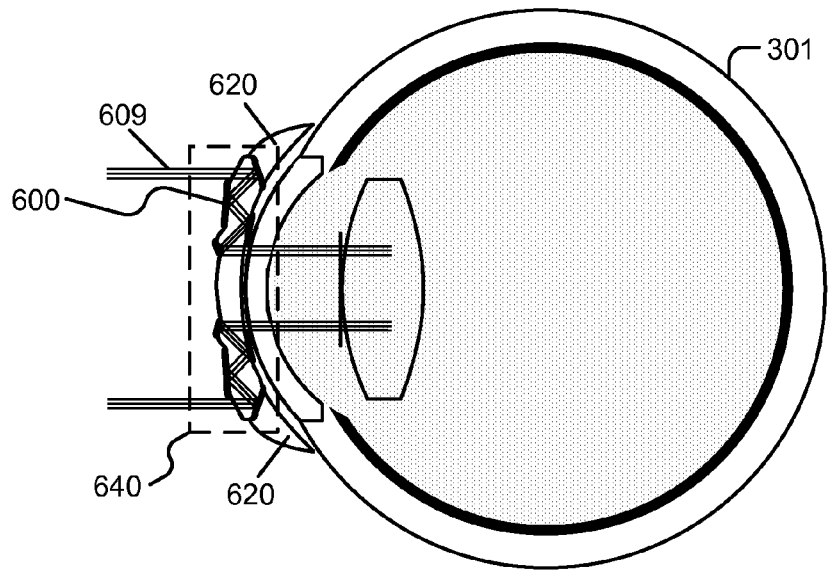
FIGS. 6A-6B show exemplary 4-folded telescopic contact lens designs.
Figure 6B:
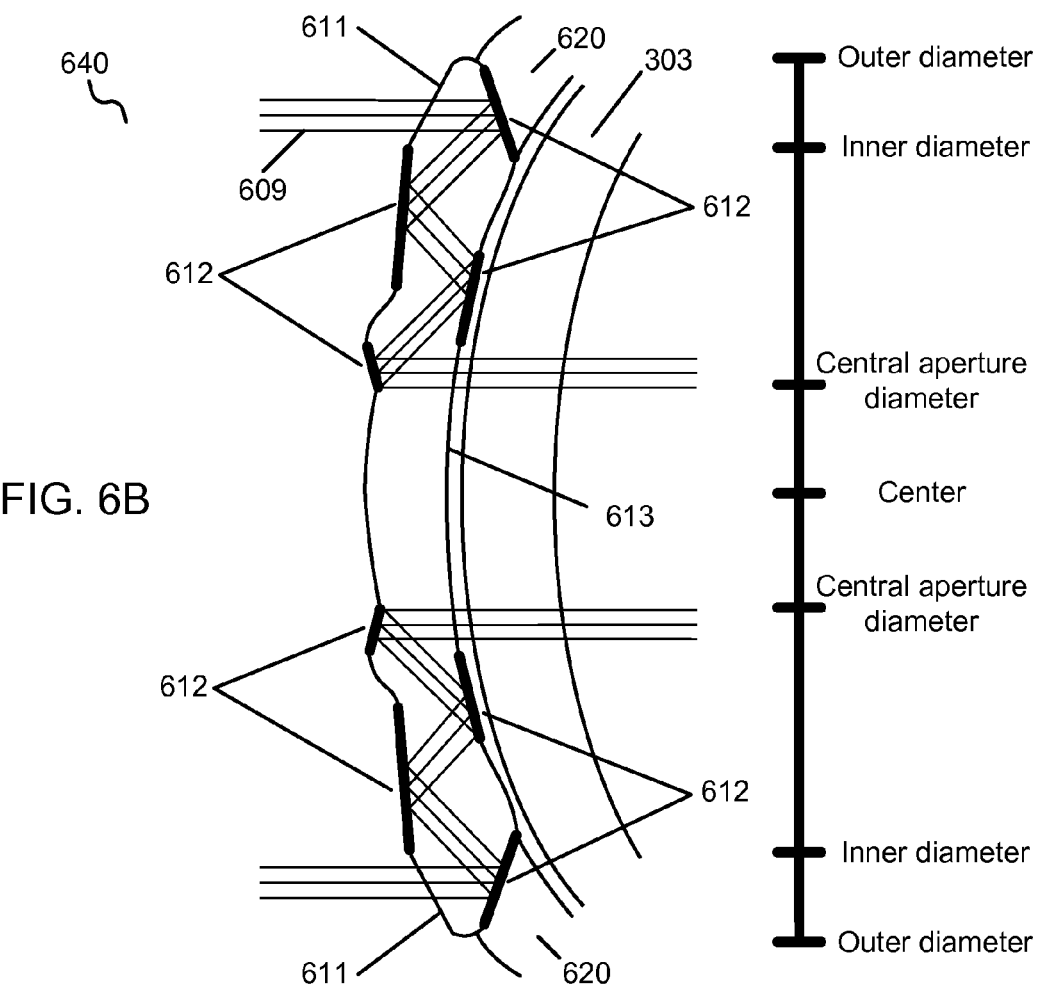

FIG. 6A features an exemplary 4-folded telescopic contact lens (600) with conformal optic elements embedded in a soft, biocompatible outer structure (620) that is placed in contact with the front of eye (301). In this example, telescopic contact lens (600) is switched to telescopic visual mode to produce a magnified image. Light (609) can enter of the telescopic contact lens (600) from the front side (e.g., from the side facing an object) of an annular input aperture, reflect along four concentric aspheric reflectors (e.g., reflectors 612 as shown in FIG. 6B) within an interior region, and pass through the back surface of a central aperture (e.g., toward the eye). Four concentric aspheric reflectors can be organized in a Cassegrain configuration in a manner such that the entire optical path of light (609) can be contained in a single solid optical element. The 4-folded telescopic contact lens (600) can be constrained to have suitably small internal physical thickness (e.g., <1.2 mm) and outer diameter (e.g., ~8 mm). For example, telescopic contact lens (600) can be made of a rigid gas permeable (RGP) material by diamond turning (e.g., single point diamond turning (SPDT)) the lens and coating the back with a patterned reflective material (e.g., silver to make silver reflectors, aluminum to make aluminum reflectors, or other black, opaque materials to block unwanted light). In other examples, the optical elements region of an exemplary telescopic contact lens can be made of materials not typically used in contact lenses, such as a poly(methyl methacrylate) PMMA (acrylic) or a calcium fluoride ($CaF_2$) material by diamond turning (e.g., SPDT) and coating the lens with reflectors. These materials may be entirely contained within a biocompatible layer to avoid direct exposure to the wearer. FIG. 6A includes a view box (640), which shows an enlarged view of telescopic contact lens (600) in FIG. 6B.

FIG. 6B exemplifies the telescopic mode of 4-folded telescopic contact lens (600) in an enlarged view (e.g., view box 640). In this example, a magnified image can be produced by permitting light (609) to enter annular aperture (611) and reflect along the four concentric reflectors (612) to pass through the backside of the optic through central aperture (613). This exemplary optical path of light (609) in telescopic mode can be peripheral to the on-axis path of light in normal vision mode, such that normal and telescopic vision can be superimposed without loss, and switched by simply blocking one of the two entrance apertures.

The positive curvature of the cornea is in the opposite direction preferred to direct the folded optical path, and therefore the design of the optical elements can be configured to fold the optical path of light to overcome this handicap. For example, this can be addressed using Fresnel optics. A Fresnel lens can segment the aperture of a conventional lens into rings, compressing the normal depth of the lens into a plane, divorcing the optical power from the physical thickness of the lens. The Fresnel lens (or reflector) can be curved in the inverse direction, e.g., following the shape of the cornea. The wide-angle performance of a Fresnel optic can be used, but the actual field of (stationary) view in many applications may only be a few degrees. This approach can offer the use a large fraction of a typical eye's surface 24 mm clear diameter for light collection, increasing the practical magnification to approach 8×~10× magnification of many conventional field binoculars.

In an exemplary configuration of a 4-folded telescopic contact lens (600), the region that comprises optical elements of telescopic contact lens (600) can be composed of a solid plastic or CaF$_2$ element with silver reflectors and be configured to have an overall mechanical curvature that matches an corneal surface with dimensions that include an outer diameter of substantially 8 mm length, an inner diameter of substantially 6.54 mm length, a center aperture diameter of substantially 2.15 mm, and a thickness of substantially 0.86 mm (with center aperture thickness of substantially 0.6 mm). This region can then be encased in an outer lens, e.g., outer structure (620). An experimental 4-folded telescopic contact lens of this exemplary configuration has been shown to offer good image resolution and 3× magnification in telescopic mode with a relatively small field of view of ±1.5°, an F/# of F/10.9 and an effective focal length (EFL, lens+eye) of 50.2 mm; and in normal mode, this configuration can offer an F/# of F/7.9 and an EFL of 17 mm.

Figure 7A:
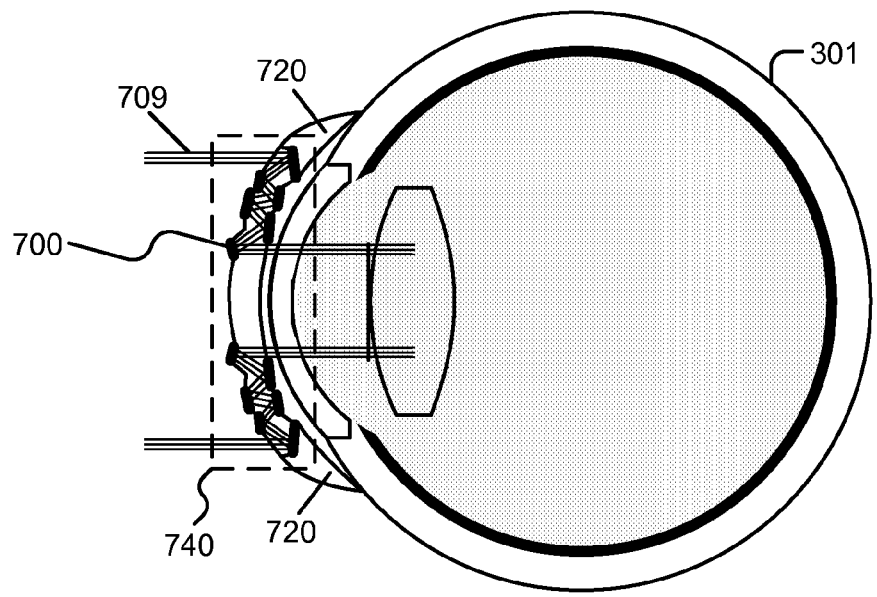
FIGS. 7A-7B show exemplary 6-folded telescopic contact lens designs.
Figure 7B:
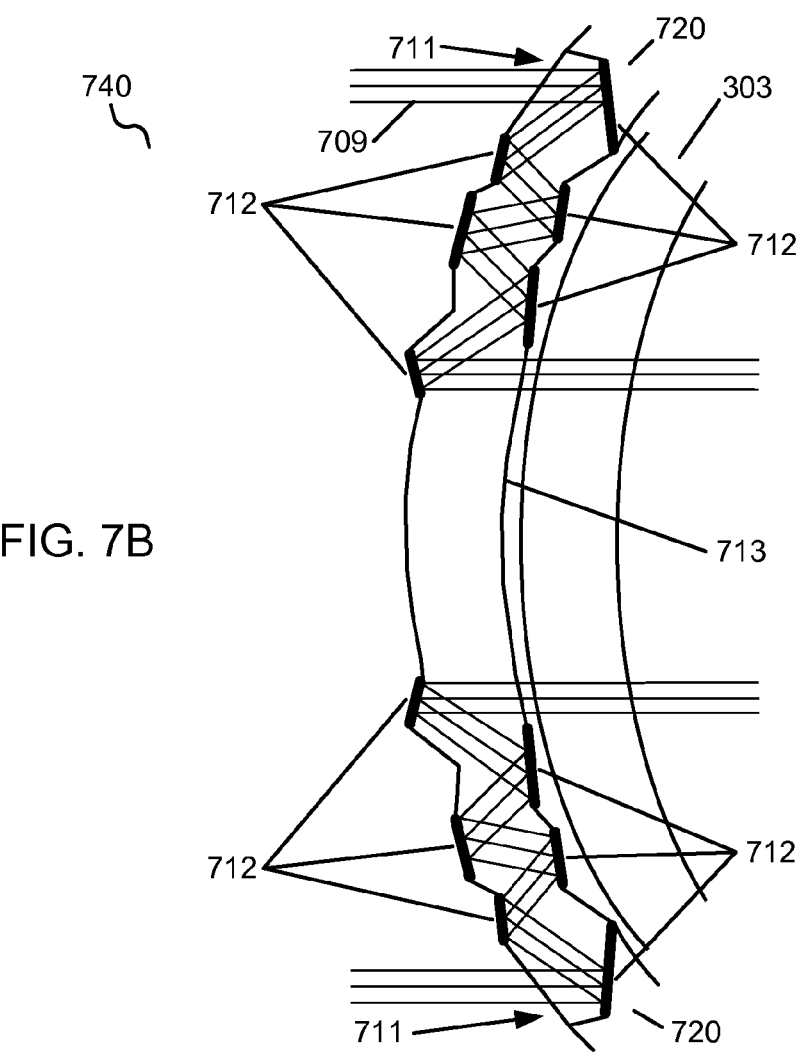

FIG. 7A features an exemplary 6-folded telescopic contact lens (700) with conformal optic elements embedded in a soft, biocompatible outer material (720), which can be placed in contact with the front of eye (301). FIG. 7A exemplifies telescopic contact lens (700) switched in telescopic visual mode to produce a magnified image. Light (709) can enter the front side (e.g., from the side facing an object) of the annular aperture, reflect along six concentric aspheric reflectors (e.g., reflectors 712 as shown in FIG. 7B), and pass through the back side (e.g., toward the eye). The 6-folded telescopic contact lens (700) can be constrained to have substantially small internal thickness (e.g., <1.2 mm) and outer diameter (e.g., ~11 mm). For example, telescopic contact lens (700) can be made of a RGP material, or other materials like PMMA, by diamond turning (e.g., SPDT) the lens, coating the back with a reflective material (e.g., silver, aluminum, or other opaque materials), and including at least one diffractive optical elements (DOE) to control chromatic aberrations. FIG. 7A includes a view box (740), which shows an enlarged view of telescopic contact lens (700) in FIG. 7B.

FIG. 7B exemplifies the telescopic mode of 6-folded telescopic contact lens (700). In this example, a magnified image can be produced by permitting light (709) to enter annular aperture (711) and reflect along the six concentric reflectors (712) to pass through the backside of the optic through central aperture (713). This exemplary optical path of light (709) in telescopic mode can be peripheral to the on-axis path of light in normal vision mode, such that normal and telescopic vision can be superimposed without loss, and switched by simply blocking one of the two entrance apertures.

Figure 8A:
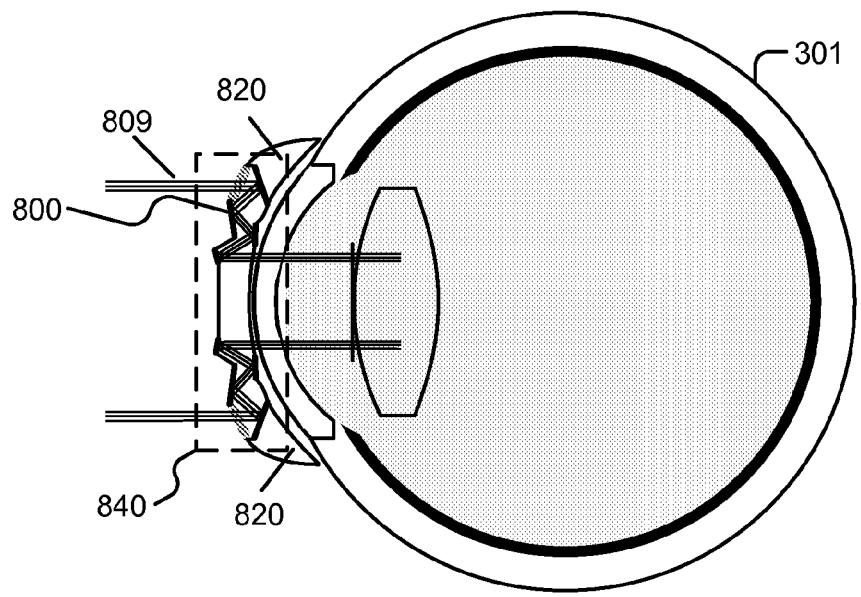
FIGS. 8A-8B show exemplary 4-folded telescopic contact lens designs with transmissive diffractive optical elements.
Figure 8B:
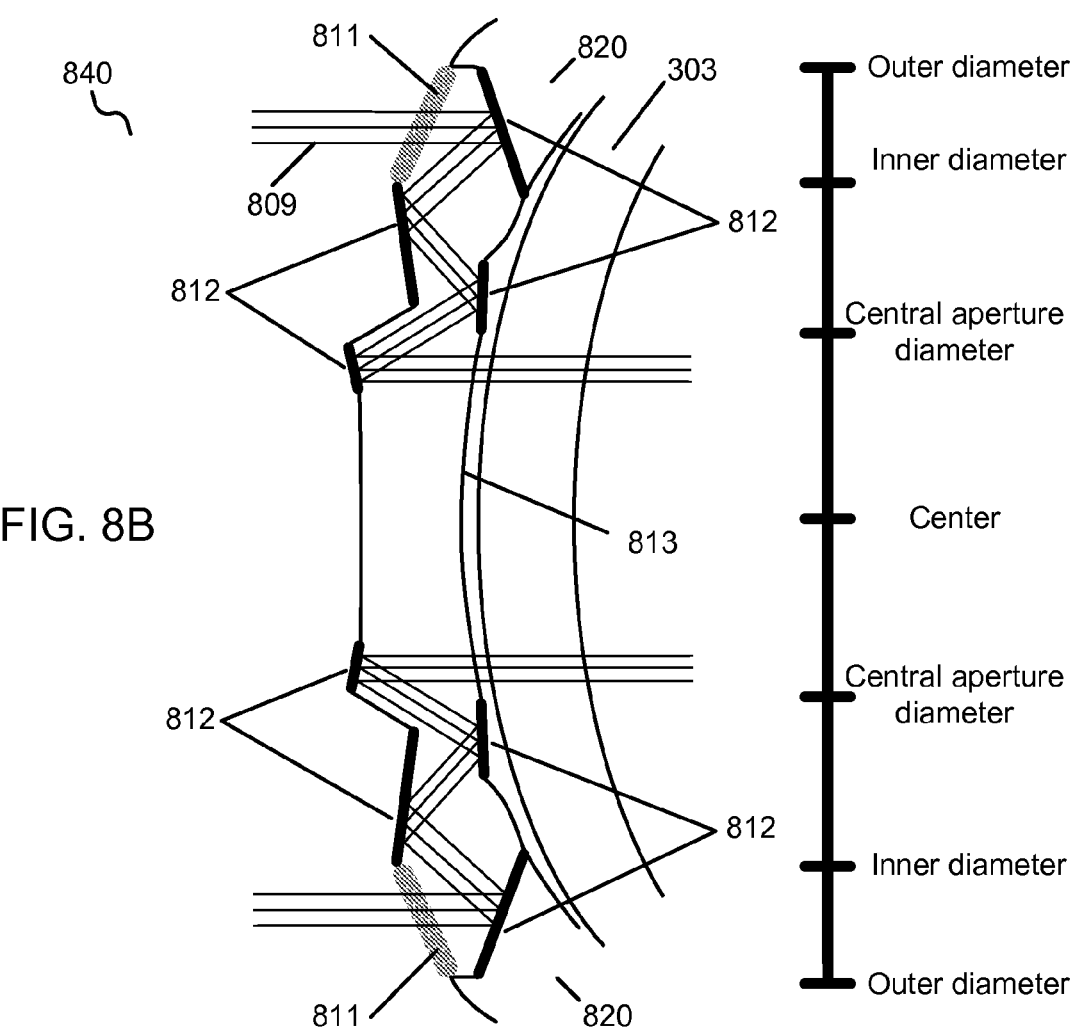

Exemplary telescopic contact lenses can include diffractive optical elements (DOEs) in addition to or instead of aspheric reflectors to manipulate light and its optical path. For example, FIG. 8A exemplifies a 4-folded telescopic contact lens (800) with conformal optic elements embedded in a soft, outer structure (820) that is placed in contact with the front of eye (301) and switched to telescopic visual mode to produce a magnified image. In this example, light (809) can enter of telescopic contact lens (800) from the front side (e.g., from the side facing an object) of an annular input aperture that includes a transmissive diffractive optic element (DOE) for achromatization (e.g., DOE 811 as shown in FIG. 8B), reflect along four concentric aspheric reflectors (e.g., reflectors 812 as shown in FIG. 8B) within an interior region, and pass through the back surface of a central aperture (e.g., toward the eye). Four concentric aspheric reflectors can be organized in a Cassegrain configuration in a manner such that the entire optical path of light (809) can be contained in a single solid optical element, and the DOEs can be configured to control chromatic aberrations. The 4-folded telescopic contact lens (800) can be made of a RGP material by diamond turning (e.g., SPDT) the lens and coating the back with a reflective material (e.g., silver, aluminum, or other black, opaque reflectors). FIG. 8A includes a view box (840), which shows an enlarged view of telescopic contact lens (800) in FIG. 8B.

FIG. 8B exemplifies the telescopic mode of 4-folded telescopic contact lens (800) in an enlarged view (e.g., view box 840). In this example, a magnified image can be produced by permitting light (809) to enter the annular aperture of telescopic contact lens (800) that includes transmissive DOE (811) and reflect along the four concentric reflectors (812) to pass through the backside of the optic through central aperture (813). This exemplary optical path of light (809) in telescopic mode can be configured to be peripheral to the on-axis path of light in normal vision mode. This means that the two optical systems for normal and telescopic vision can be superimposed without loss, and switched by simply blocking one of the two entrance apertures.

In an exemplary configuration of a 4-folded telescopic contact lens (800), telescopic contact lens (800) can be composed of a RGP plastic similar in mechanical and optical properties to PMMA (acrylic) with silver reflectors and be configured to have a curvature that matches the corneal surface of an eye with dimensions that include an outer diameter of substantially 8 mm length, an inner diameter of substantially 6.2 mm length, a center aperture diameter of substantially 2.18 mm, and a thickness of substantially 1.17 mm (with center aperture thickness of substantially 0.95 mm). An experimental 4-folded telescopic contact lens of this exemplary configuration has been shown to offer good image resolution and 2.8× magnification in telescopic mode with a field of view of 5°, an F/# of F/9.4 and an effective focal length of 47.7 mm; and in normal mode, this configuration can offer an F/# of F/7.8 and an EFL of 17 mm.

Figure 9:
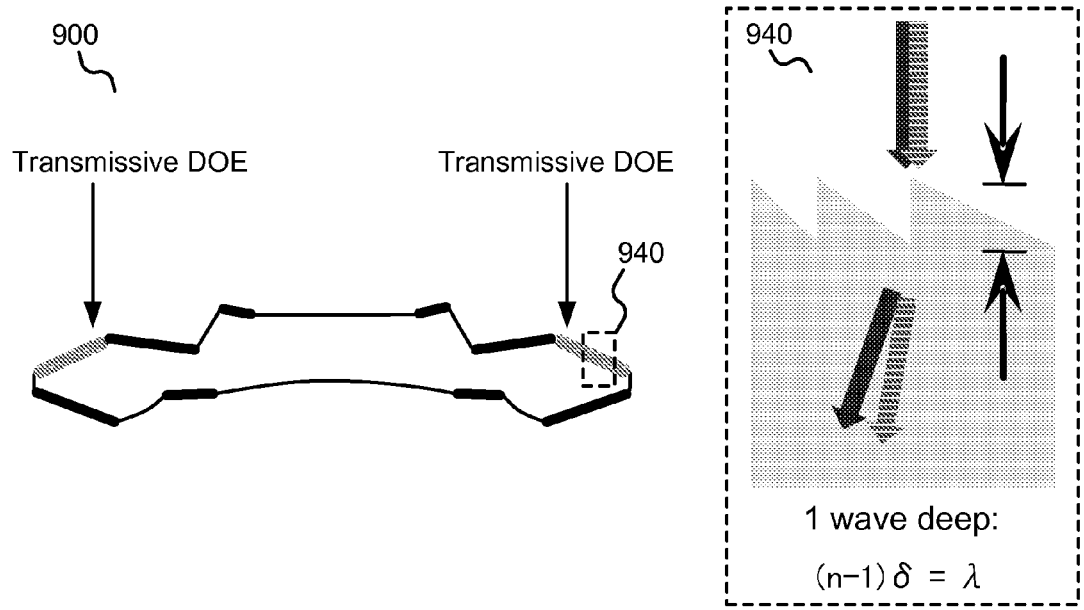
FIG. 9 shows a planar view of an exemplary 4-folded telescopic contact lens with transmissive diffractive optical elements.

FIG. 9 shows a planar view of an exemplary 4-folded telescopic contact lens (900) with transmissive diffractive optical elements (DOEs) placed at the annular aperture. A transmissive DOE can be placed at other locations within an exemplary contact lens, e.g., above reflective optical elements. Transmissive DOEs can be used to control chromatic aberrations of light through telescopic contact lens (900). Transmissive DOEs can be employed into telescopic contact lens (900) by creating analog phase gratings (kinoform) by diamond turning (e.g., SPDT) into the optic lens material (e.g., RGP material). For example, SPDT resolution of analog phase gratings can be ~8 μm lateral period gratings with >100 nm variation in depth. FIG. 9 shows an enlarged cross-section of the outer annular aperture of telescopic contact lens (900) in view box (940) that illustrates exemplary surfaces that make up a transmissive DOE optical element. Light can be diffracted in a controlled way upon its optical path by surfaces which impose a desired periodic (or nearly periodic) phase profile upon the transmitted light, wherein the depth of the profile is chosen based on the internal material and the surrounding material (e.g., a soft polymer with a higher or lower index of refraction than the internal material).

Figure 10:
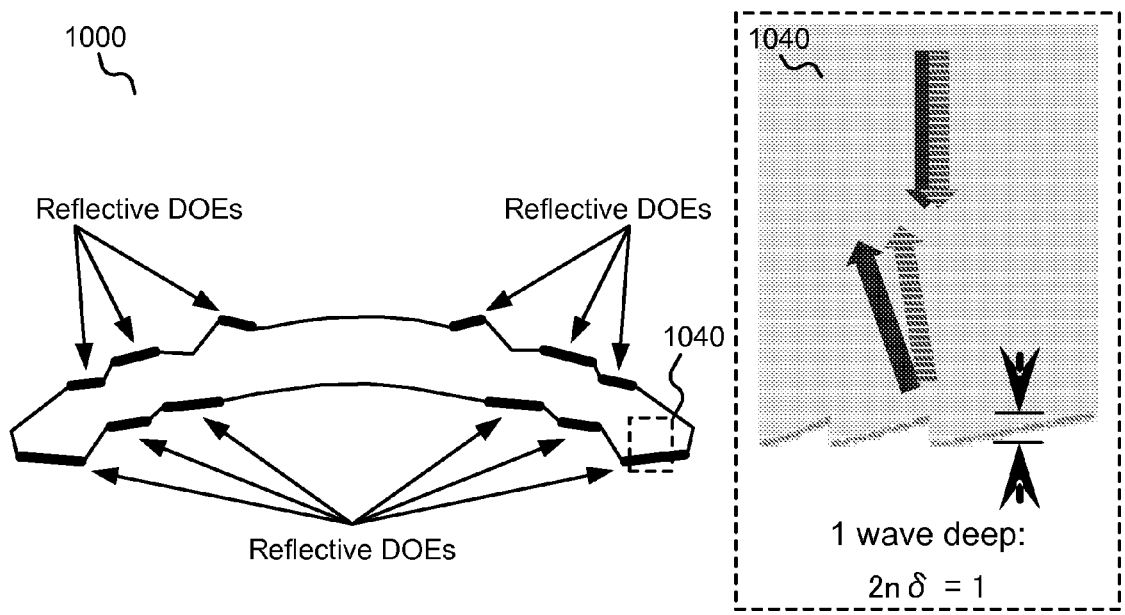
FIG. 10 shows a planar view of an exemplary 6-folded telescopic contact lens with reflective diffractive optical elements.

FIG. 10 shows a planar view of an exemplary 6-folded telescopic contact lens (1000) with reflective diffractive optical elements (DOEs), which can be located along folds between the outer annular aperture and central aperture to direct light along a determined optical path, e.g., to magnify an image. Reflective DOEs can be placed at other locations within an exemplary contact lens. Reflective DOEs can be used to reflect light while controlling chromatic aberrations of light passing through telescopic contact lens (1000). Reflective DOEs can be employed into telescopic contact lens (1000) by creating analog phase gratings by diamond turning (e.g., SPDT) into the optic lens material (e.g., RGP material) and subsequent coating using a reflective material (e.g., aluminum). For example, SPDT resolution of analog phase gratings can be ~8 μm lateral period gratings with <100 nm variation in depth. FIG. 10 shows an enlarged cross-section of the outer annular aperture of telescopic contact lens (1000) in view box (1040) that illustrates exemplary kinoforms that make up a reflective DOE optical element. Light can be reflected upon its optical path by kinoforms.

While diffractive elements are one way to provide chromatic compensation for an optical system, it is also possible to combine refractive materials with differing indexes of refraction at each wavelength, such that the overall optical response is substantially independent of color over the visible light spectrum. Such achromatic lenses are well known in the art of lens design, and techniques used for the design of multi-element lens systems are readily applicable to an achromatic contact lens.

Figure 11A:
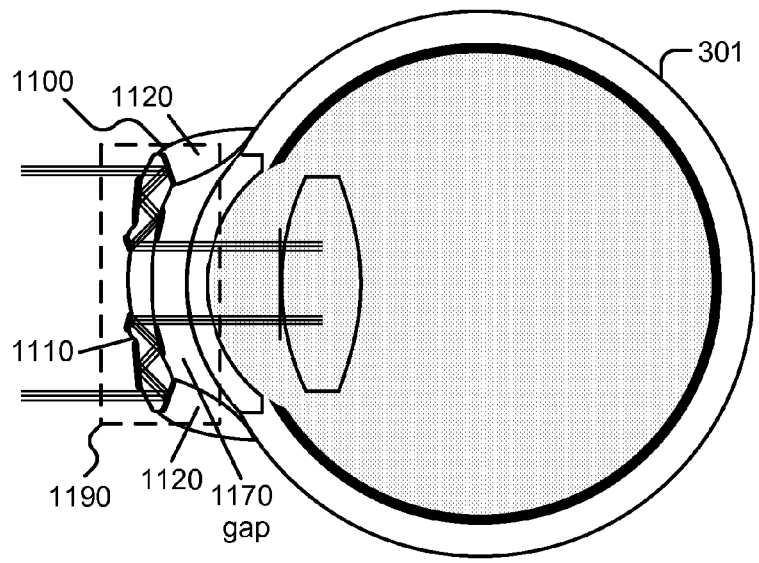
FIGS. 11A-11B show exemplary 4-folded "gap" telescopic contact lens designs.
Figure 11B:
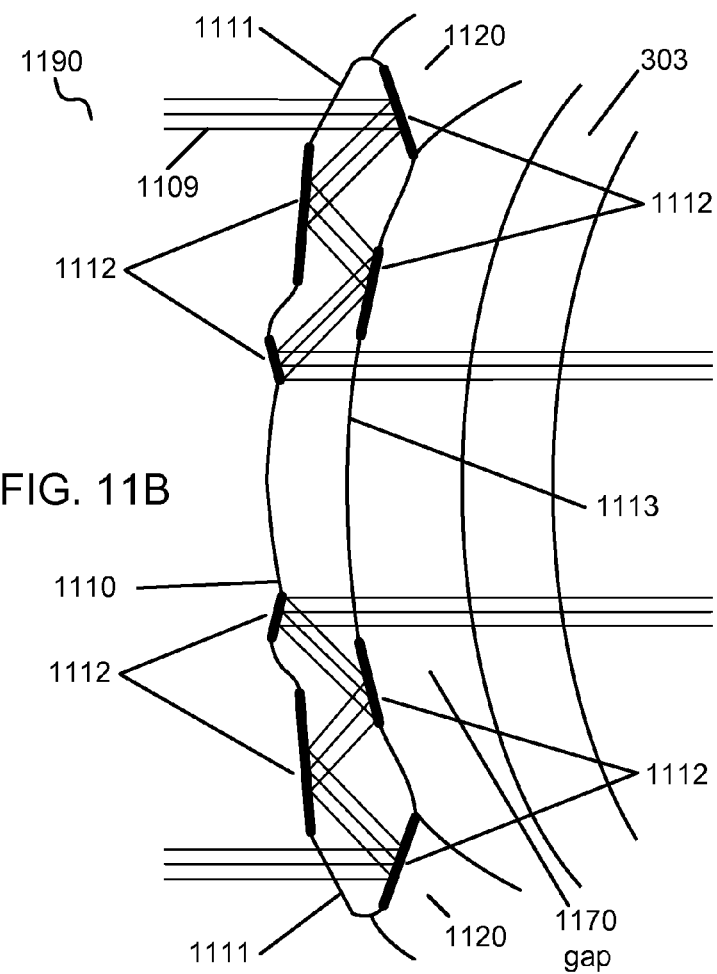

In another exemplary embodiment, a telescopic contact lens can be integrated with a soft, biocompatible outer lens configured such that there is a "gap" between the lens optic and a user's eye (as shown in FIGS. 11A-11D). FIGS. 11A and 11B show an exemplary 4-folded telescopic contact lens (1100) that includes a region with one or more optical elements (e.g., optical region (1110)) that is spaced away from the user's eye to create a gap (1170) between the cornea (303) of eye (301) and a soft, biocompatible outer material (1120) that is placed in contact with eye (301). In one aspect, gap (1170) in exemplary telescopic contact lens (1100) can be filled with tears or any other fluid that is biocompatible and maintains the viability of the corneal tissue. In another aspect, gap (1170) can be filled with air so that the reflectors (1112) are deposited on the internal surface of the lens and face the air gap. In this configuration, it can be advantageous to fill gap (1170) with air that can provide oxygenation to the corneal tissue cornea (303). Outer material (1120) can be configured to be in direct contact with cornea (303) such that it can prevent the corneal tissue from drying and remain permeable to oxygen flow.

In the example shown in FIGS. 11A and 11B, telescopic contact lens (1100) is switched to telescopic visual mode to produce a magnified image. Light (1109) can enter of telescopic contact lens (1100) from the front side (e.g., from the side facing an object) of an annular input aperture (1111), reflect along four concentric aspheric reflectors (1112) within an interior region between annular aperture (1111) and central aperture (1113), and pass through the back surface of a central aperture (1113) toward the eye (301). Four concentric aspheric reflectors can be organized in a Cassegrain configuration in a manner such that the entire optical path of light (1109) can be contained in a single solid optical element (e.g., optical region (1110)). The exemplary telescopic contact lens (1100) can be made of a RGP material by diamond turning (e.g., SPDT) the lens and coating the back with a reflective material (e.g., silver, aluminum, or other black, opaque reflector materials). In other examples, telescopic contact lens (1100) can be made of a PMMA or a CaF$_2$ material. This exemplary optical path of light (1109) in telescopic mode can be peripheral to the on-axis path of light in normal vision mode, such that normal and telescopic vision can be superimposed without loss, and switched by simply blocking one of the two entrance apertures. FIG. 11A includes a view box (1190), which shows an enlarged view of telescopic contact lens (1100) in FIG. 11B.

Figure 11C:
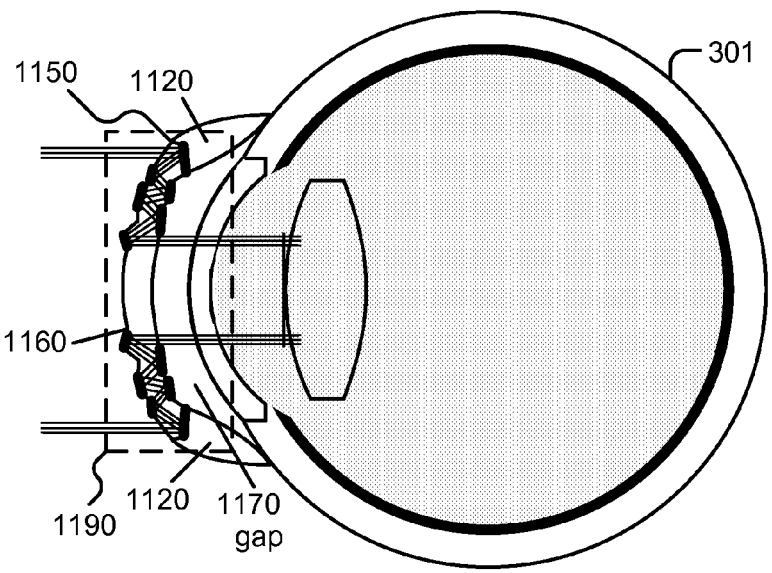
FIGS. 11C-11D show exemplary 6-folded "gap" telescopic contact lens designs.
Figure 11D:
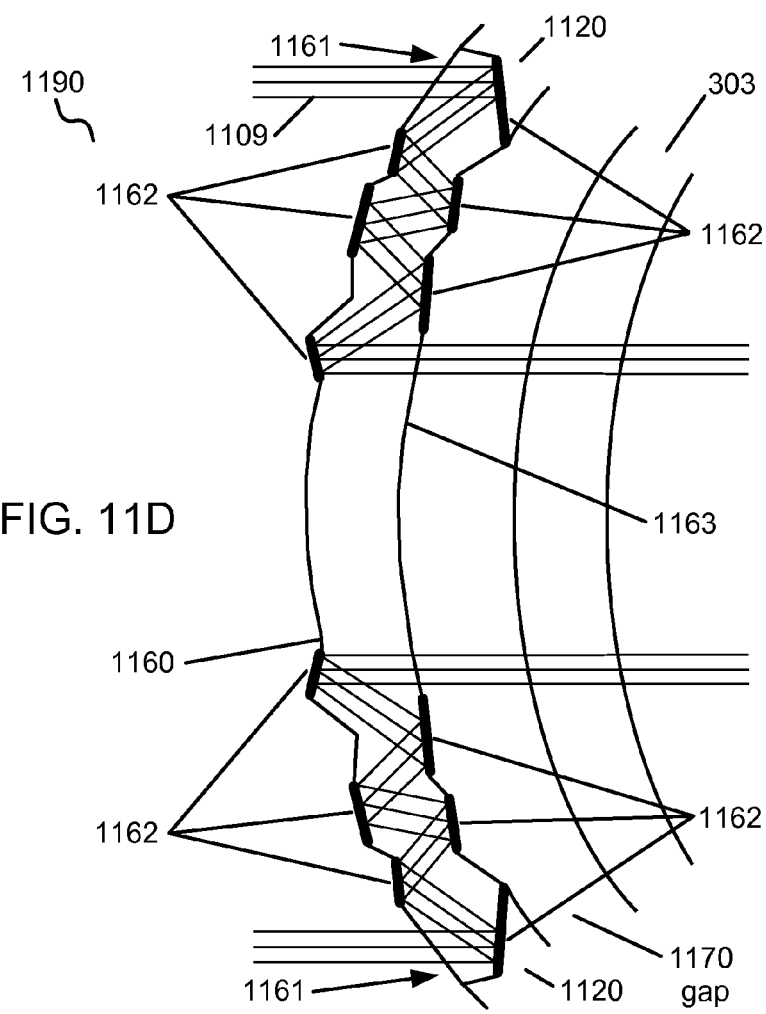

FIGS. 11C and 11D show an exemplary 6-folded telescopic contact lens (1150) that includes a region with one or more optical elements (e.g., optical region (1150)) that is spaced away from the user's eye to create a "gap" (1170) between the cornea (303) of eye (301) and a soft, biocompatible outer material (1120) that is placed in contact with eye (301). In one aspect, gap (1170) in exemplary telescopic contact lens (1150) can be filled with tears or any other fluid that is biocompatible and maintains the viability of the corneal tissue. In another aspect, gap (1170) can be filled with air so that the reflectors (1162) are deposited on the internal surface of the lens and face the air gap, and outer material (1120) can be configured to be in direct contact with cornea (303) such that it can prevent the corneal tissue from drying and remain permeable to oxygen flow.

In the example shown in FIGS. 11C and 11D, telescopic contact lens (1150) is switched to telescopic visual mode to produce a magnified image. Light (1109) can enter of telescopic contact lens (1150) from the front side (e.g., from the side facing an object) of an annular input aperture (1161), reflect along six concentric aspheric reflectors (1162) within an interior region between annular aperture (1161) and central aperture (1163), and pass through the back surface of a central aperture (1163) toward the eye (301). Four concentric aspheric reflectors can be organized in a Cassegrain configuration in a manner such that the entire optical path of light (1109) can be contained in a single solid optical element (e.g., optical region (1160)). The exemplary telescopic contact lens (1150) can be made of a RGP material by diamond turning (e.g., SPDT) the lens and coating the back with a reflective material (e.g., silver, aluminum, or other black, opaque reflector materials). In other examples, telescopic contact lens (1150) can be made of a PMMA or a CaF$_2$ material. This exemplary optical path of light (1109) in telescopic mode can be peripheral to the on-axis path of light in normal vision mode, such that normal and telescopic vision can be superimposed without loss, and switched by simply blocking one of the two entrance apertures. FIG. 11C includes a view box (1190), which shows an enlarged view of telescopic contact lens (1150) in FIG. 11D.

Figure 12:
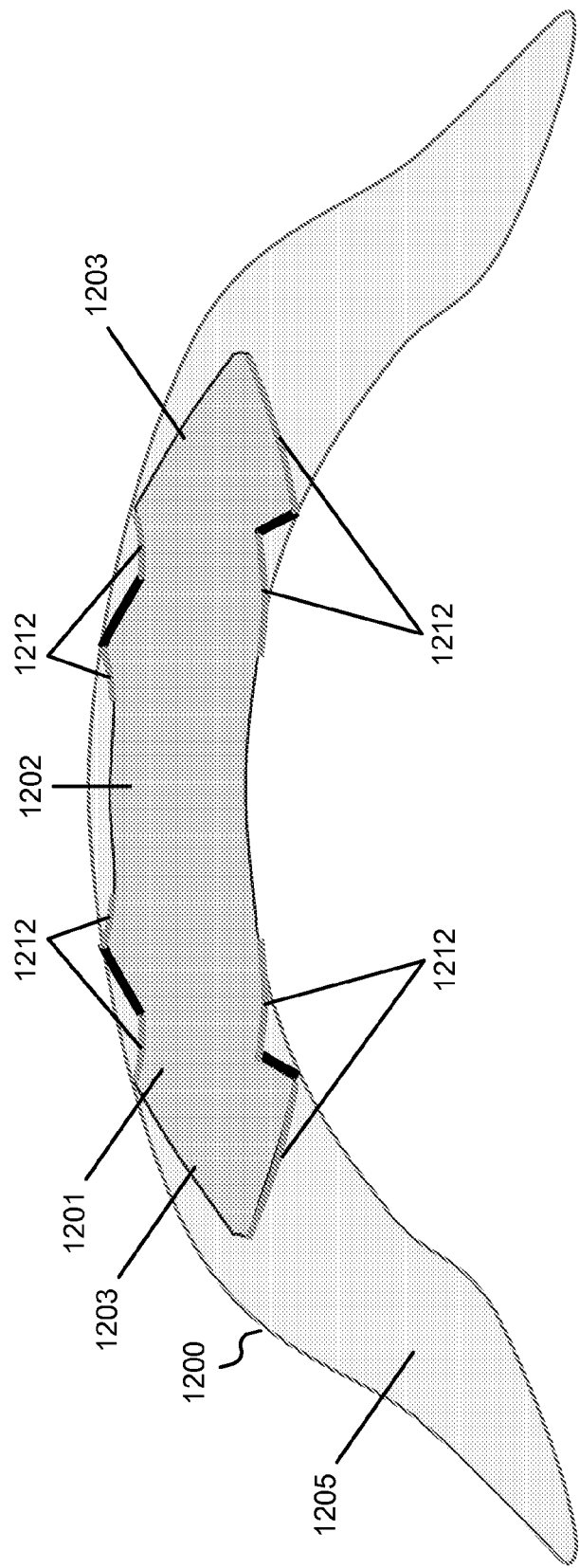
FIG. 12 shows an exemplary telescopic contact lens with optical elements embedded in an outer lens.

The dual-vision contact lens designs described in this document can be implemented in various configurations. FIG. 12 shows an exemplary configuration of a telescopic contact lens (1200) with optical elements embedded in an outer structure or casing. This telescopic contact lens (1200) includes an outer structure (1205) shaped to include an interior volume (1201) with a central aperture (1202) and an annular aperture (1203), and a peripheral lens material forming a smooth lens skirt. The interior volume (1201) enclosed within the outer structure (1205) can be shaped with reflective and refractive surfaces to accommodate a series of reflective optical elements placed at selected locations form a folded optical paths for the telescopic view. In the example shown in FIG. 12, four concentric aspheric optical elements are used as reflective lenses inside the solid interior (1201). In various implementations, the interior volume (1201) can be hollow (e.g., gas filed) or filled with another solid material. For example, telescopic contact lens (1200) can use an embedded multiple reflection lens with achromatic color compensation using biocompatible skirting materials. Telescopic contact lens (1200) can be made of one or more RGP materials by diamond turning or molding the lens and coating the back with a patterned reflective material (e.g., aluminum) and then applying a second coating using a black, opaque material to block undesired light paths. Telescopic contact lens (1200) can be embedded in a mold (e.g., acrylic polymer or RGP material) that can be shaped using diamond turning or molding techniques to take an overall shape of a corneal or scleral contact lens (e.g., to fit a individual user's required prescription). The shapes of the optical surfaces that form the annular aperture, and the materials used for the inner chamber (1201) and lens body (1205), can be chosen so that the overall optical image formed is substantially independent of color over the visible light spectrum. In some aspects, the inner chamber (1201) can be hollow, and the central and outer annular apertures can be substantially uniform in thickness, so that no diffractive or refractive color correction is needed. In some configurations of telescopic contact lens (1200), the central aperture (1202) can be permanently blocked such that only the annular aperture (1203) can provide light into the exemplary telescopic lens (1200). In this exemplary configuration of telescopic contact lens (1200), only telescopic vision can be produced.

Recognizing that it is desirable to provide the maximum possible aperture for normal vision, especially for night vision, the optical system can be designed so that some or all of the internally reflective surfaces that form the telescopic vision path are substantially transparent to light which is incident from outside the lens. FIGS. 13A-13C show such exemplary dual-use apertures using total internal reflection (TIR) mirrors in an exemplary telescopic contact lens (1300). The arrow shown in FIG. 13A can represent the length (e.g., 8 mm) of an aperture of an entirely dilated pupil so that telescopic contact lens (1300) can transmit light through the aperture of the pupil. Telescopic contact lens (1300) can be configured with TIR mirrors reflectors (1302), which can allow for night vision. In night vision, much less light is available to form a visual image, and a limited amount of light that is transmitted using telescopic visual mode may be insufficient (e.g., with previously described reflectors, such as opaque black or aluminum reflectors). In this example, TIR mirror reflectors (1302) in the telescopic optical path can be configured to only reflect an internal beam between TIR mirror reflectors (1302) of telescopic contact lens (1300) that originated through its outer annular aperture. TIR mirror reflectors (1302) can be configured to allow light to enter telescopic contact lens (1300) between the outer annular aperture and center of the telescopic contact lens (1300) and pass through telescopic contact lens (1300) unobstructed, which can provide a normal visual image. In this case, TIR reflection of internal optical paths can be employed that use a low-index AR coating. Telescopic rays can be designed to be incident at beyond a critical angle, while 1× vision rays through the central aperture can provide substantially normal vision.

FIGS. 13B and 13C demonstrate an exemplary telescopic contact lens (1330) that can be configured with TIR mirrors reflectors and a switchable shutter to completely block normal or telescopic visual modes. The arrows shown in FIGS. 13B and 13C represent the length (e.g., 8 mm) of an exemplary aperture of an entirely dilated pupil. FIG. 13B shows an exemplary telescopic contact lens (1330) that includes TIR mirrors reflectors (1332) and aperture shutter (1341). In this example, TIR mirror reflectors (1332) in the telescopic optical path can be configured to only reflect an internal beam between TIR mirror reflectors (1332) of telescopic contact lens (1330) that originated through its outer annular aperture. The aperture shutter (1341) is configured in telescopic mode, blocking light from entering the central aperture. In this exemplary mode, reflectors (1332) can be TIR mirror reflectors or opaque reflectors, since no light is permitted to enter telescopic contact lens (1330) between its outer annular aperture and its center. FIG. 13C shows the exemplary telescopic contact lens (1330) that includes TIR mirrors reflectors (1332) configured as shown in FIG. 13B and aperture shutter (1341) configured in normal visual mode. In this example of normal visual mode, TIR mirror reflectors (1332) can allow light to transmit through telescopic contact lens (1330). The aperture shutter (1341) can be configured in normal visual mode, in which light is blocked from entering the outer annular aperture.

Referring to FIG. 2, a switching mechanism can be provided to switch on or off the central aperture and the annular aperture. This switching mechanism can be implemented in various configurations. Several examples are provided below.

FIGS. 14A and 14B show cross-sectional side and frontal planar views of switching between normal visual mode (as seen in FIG. 14A) and telescopic visual mode (as seen in FIG. 14B) using an exemplary telescopic contact lens (1400) and a switchable polarizing lens (1450) of wearable eyeglasses. Telescopic contact lens (1400) can include polarizing regions on the frontal exterior of the telescopic contact lens (1400). For example, a polarizing filter of a particular polarization alignment can be configured over the outer annular aperture (1402) of telescopic contact lens (1400), while another polarizing filter can be configured over the central aperture (1401) of telescopic contact lens (1400) having an orthogonal polarization to that of the polarizing filter over the outer annular aperture. Visual modes of normal and telescopic vision using telescopic contact lens (1400) can be switched with the aid of a switchable-polarizing lens (1450), e.g., included in eyeglasses worn by a user. In one aspect, eyeglasses worn by a user can include switchable-polarizing lenses (e.g., lens (1450)) that can be configured to switch polarizations so that light (1409) can pass through lens (1450) with a particular polarization that would be permitted through only one of the apertures, e.g., either aligned with the polarization of the polarizing filter covering the central aperture (1401) or aligned with the polarization of the polarizing filter covering outer annular aperture (1402) of telescopic contact lens (1400). For example, switchable-polarizing lens (1450) can include at least one lens (1461) with a fixed polarization (e.g., a constant polarizing filter) configured to a particular polarization orientation and at least one switch lens (1462) that can change the overall polarization of light transmitted through lens (1450).

The switchable-polarization lens can be controlled by a simple electrical switch to select between normal or telescopic visual modes where said switch is mounted, for example, on the bridges and/or temples of the eyeglasses frames holding the switchable-polarization lenses. For example, an exemplary switch mounted on eyeglasses with switchable-polarizing lens (1450) and interfaced with switchable-polarization lens (1450), in which a user can switch polarizations manually, e.g., switching by hand, and switch between normal and telescopic visual modes. In other examples, the system can provide hands-free operation where the visual mode is controlled by a voluntary movement of the eyes or face.

Figure 15A:
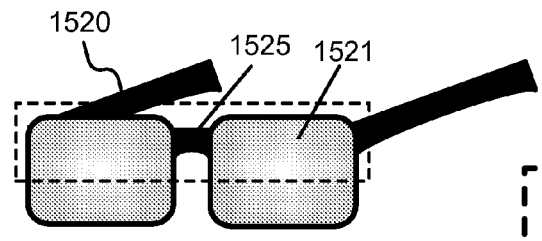
FIGS. 15A-15B an exemplary telescopic contact lens aided by switchable-polarizing lenses of eyeglasses for hands-free switching.
Figure 15B:
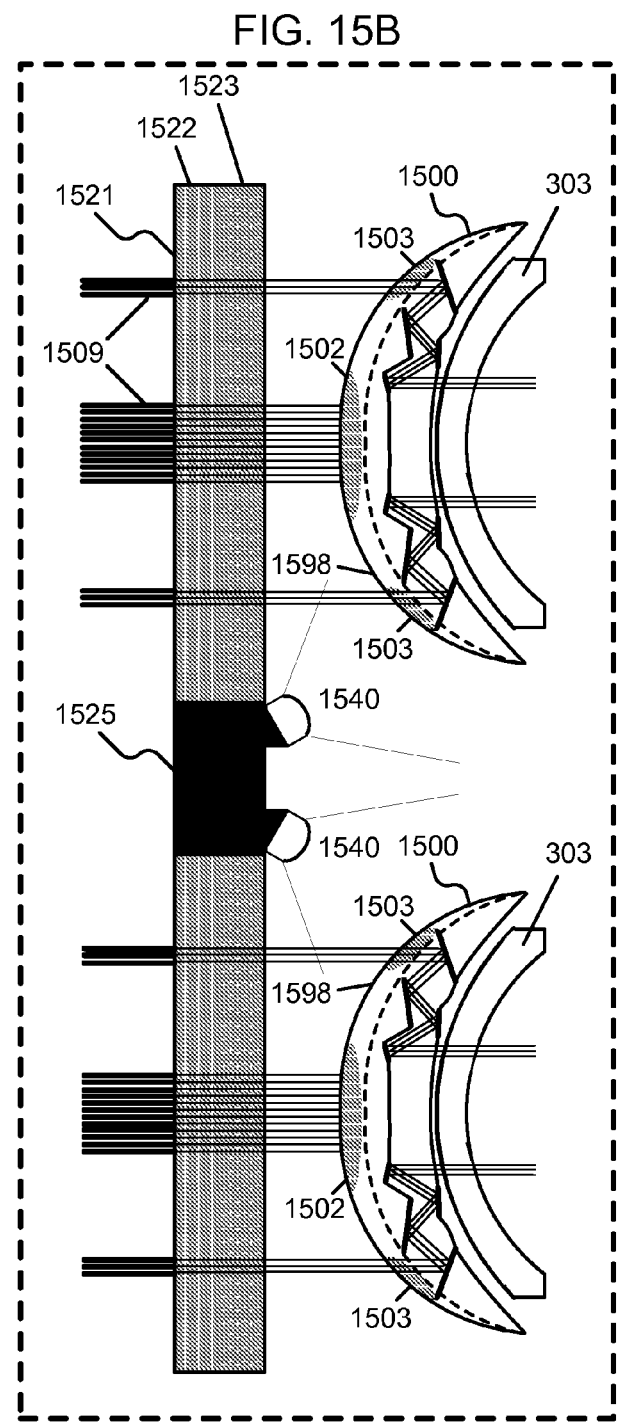

FIGS. 15A-15B show exemplary polarizing lens eyeglasses (1520) with one or more light emitter devices (e.g., a light emitting diode (LED)) and light detecting devices (e.g., a photodiode (PD)) for monitoring the user to control switching between normal and telescopic visual modes in an exemplary telescopic contact lens (1500). Eyeglasses (1520) can include switchable polarizing lens (1521) over each eye region of the user and an LED or other light emitting emitter mounted on the bridge (1525) of the eyeglasses (1520) to trigger polarization switching of lens (1521). Telescopic contact lens (1500) can include central aperture (1502) and outer annular aperture (1503), which can be covered by a covers, also referred to as shutters. The shutters can be light-absorptive electrochromic shutters, liquid crystals (e.g., twisted-nematic liquid crystal switch), and light-reflecting electrochromic shutters (e.g., electro reflective electrochromic switchable mirrors). The shutters can be configured to a particular polarization, which can be switchable to a different polarization. The shutters can be shaped to match the area and dimensions of the central and outer annular apertures to provide for full or partial coverage.

In one example of hands-free control, eyeglasses (1520) can include a light emitter (e.g., LED) and a light detector (e.g., PD) in a single module, such that the exemplary light emitter and detector are in a module (1540) that can be mounted on the bridge (1525) of the eyeglasses (1520) to trigger switching between switchable polarizing lens (1521). Light emitter and detector module (1540) can illuminate one or more regions on telescopic contact lens (1500), which are reflective or retro-reflective, e.g., on the external frontal surface (1598) that faces the lens (1521). A reflective or retro-reflective surface can be located over any region of telescopic contact lens (1500) that is detectible by a light detector, e.g. PD light detector as part of module (1540), and be non-obstructive of light that enters the apertures of the telescopic contact lens (1500). For example, when the eye is open, a portion of the illuminating light emitted by module (1540) and reflected from telescopic contact lens (1500) is directed to module (1540) that can include a light detecting PD. When the eye is closed, the light signal on module (1540) is interrupted. Eyeglasses (1520) can include a switch control (e.g., in the bridge or temple of the eyeglasses) that can switch the polarization of at least one polarized lens, e.g., polarized lens (1521) and/or polarized lens (1523). Central aperture (1502) and outer annular aperture (1503) can each be covered by a shutter with different polarizations, e.g., orthogonal polarizations. Based on switching control in eyeglasses (1520), polarized lenses (1522) and/or (1523) can be configured to a polarization that can match the polarization of the shutter covering central aperture (1502) or outer annular aperture (1503), e.g., rapidly switching between normal and telescopic vision. Module (1540) can be powered by a mounted battery, photovoltaic (PV) cells, or a radio frequency (RF) source that can cover the exterior of eyeglasses (1520). An exemplary "wink-blink detection" switching technology can be included in a combination of exemplary telescopic contact lens (1500) and eyeglasses (1520). Exemplary "wink-blink detection" switching technology is explained in further detail later in this document. Other techniques can also be used to monitor the user and enable hands-free control in the eyeglasses, including the use of compact imagers to look for specific eye or facial movements.

Figure 16A:
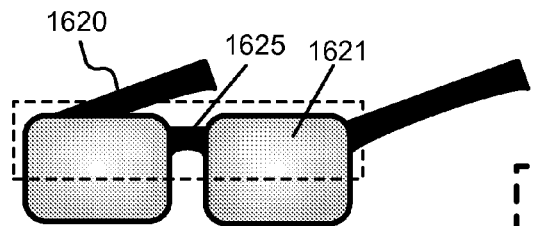
FIGS. 16A-16D show exemplary polarizing lens eyeglasses with light emitter for switching between normal and telescopic visual modes using wink detection in an exemplary telescopic contact lens.
Figure 16B:
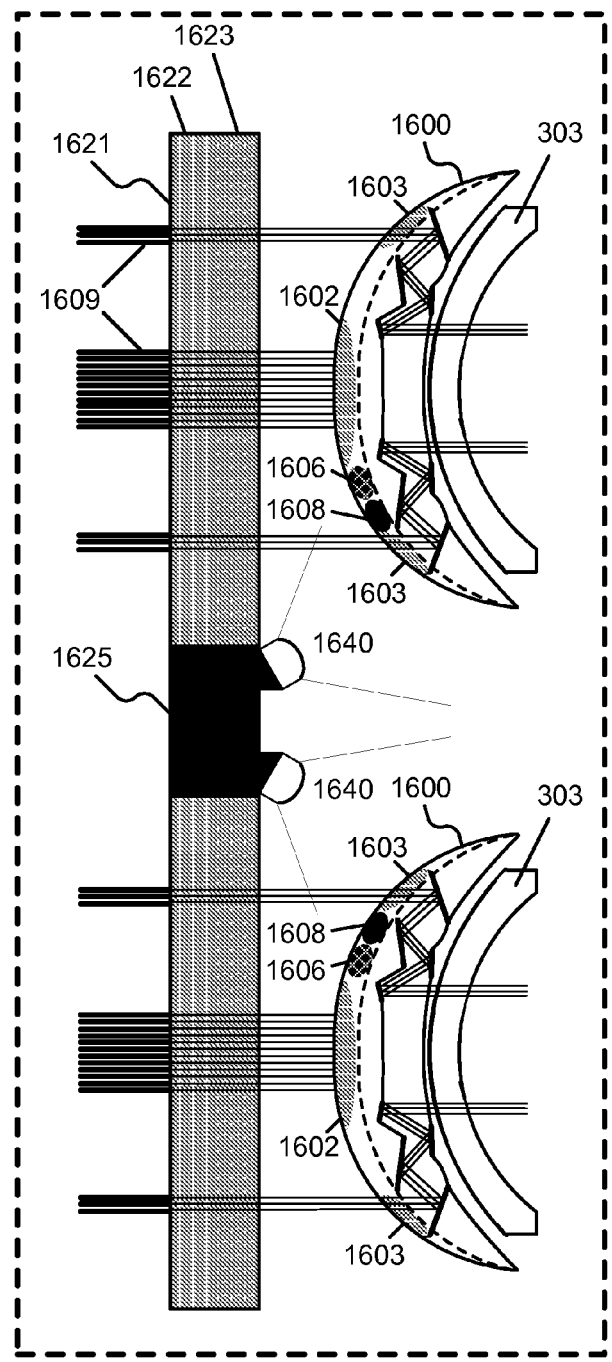
Figure 16D:
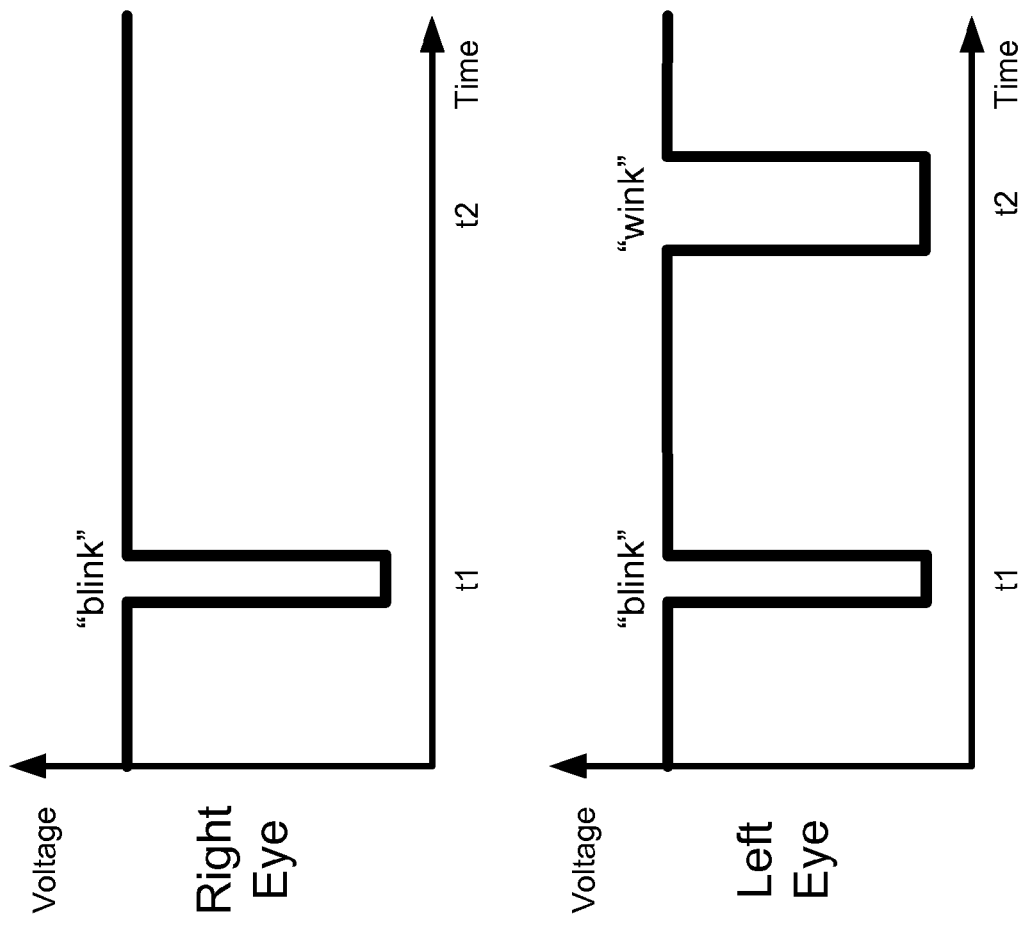
Figure 16C:
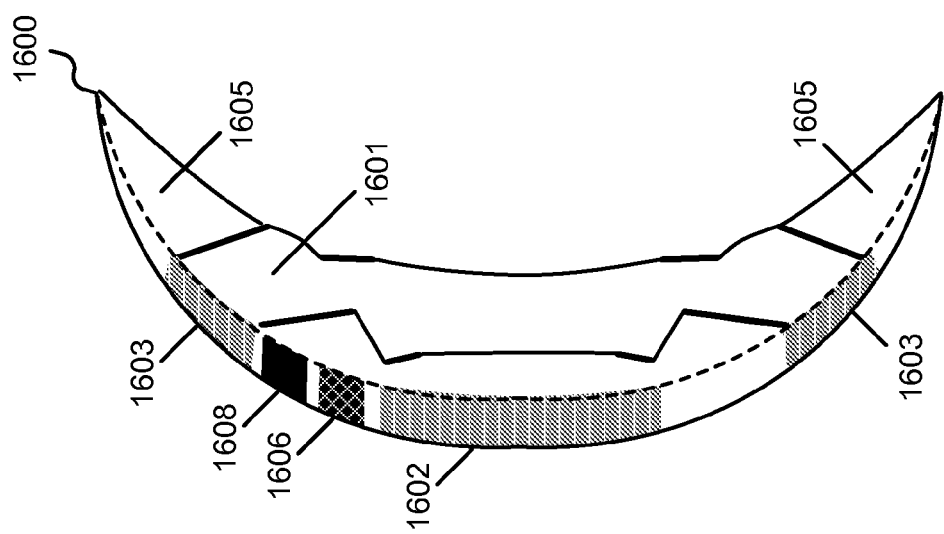

FIGS. 16A-16C show exemplary polarizing lens eyeglasses (1620) with one or more light emitter devices (e.g., a light emitting diode (LED)) for monitoring the user to control switching between normal and telescopic visual modes, and FIG. 16D shows an exemplary wink-blink detection scheme for switching shutter control over apertures in an exemplary telescopic contact lens (1600). Referring to FIGS. 16A, 16B, and 16C, eyeglasses (1620) can include switchable polarizing lens (1621) over each eye region of the user and an LED or other light emitting emitter mounted on the bridge (1625) of the eyeglasses (1620) to trigger switching between shuttering central aperture (1602) and outer annular aperture (1603) in an exemplary telescopic contact lens (1600). For example, central aperture (1602) and outer annular aperture (1603) can be covered by a switchable covers, also referred to as shutters. The shutters can be light-absorptive electrochromic shutters, liquid crystals (e.g., twisted-nematic liquid crystal switch), and light-reflecting electrochromic shutters (e.g., electro reflective electrochromic switchable mirrors). The shutters can be configured to allow for complete blocking of light rays in normal and/or telescopic visual modes (e.g., fully opaque) or varying degrees of translucence, e.g., ranging between 0% transparency to 100% transparency. The shutters can be configured to a particular polarization, which can be switchable to a different polarization. The shutters can be shaped to match the area and dimensions of the central and outer annular apertures to provide for full or partial coverage.

In some aspects, eyeglasses (1620) can include LED or other light emitting emitter (1640) can illuminate one or more regions on telescopic contact lens (1600). Telescopic contact lens (1600) can include one or more light detector (1608), which can include a light detecting PD. For example, when the eye is open, a portion of the illuminating light emitted by light emitter (1640) is directed to light detector (1608). When the eye is closed, the light signal on light detector (1608) is interrupted. Providing one or more PD per eye can provide a continuous electrical monitor of the both eyes, so that both blinks and winks can be detected. Telescopic contact lens (1600) can include a switch control (1606) that can switch between the central aperture (1602) and outer annular aperture (1603), e.g., rapidly switching between normal and telescopic vision. Control switch (1606) can be located along the interior region of telescopic contact lens (1600), e.g., between the two optical apertures above the fold mirrors of the optical region (1601). Other techniques can also be used to monitor the user and enable hands-free control, including the use of compact imagers to look for specific eye or facial movements.

FIG. 16C shows a cross-sectional side planar view of the exemplary telescopic contact lens (1600), which includes four concentric aspheric reflectors such that it is configured as a 4-folded lens, but other configurations can be incorporated into telescopic contact lens (1600), e.g., as a 6-folded lens, with TIR mirror DOEs, etc. Switch (1606) can include one or more switching technologies. Switching technologies can include aperture blocking, light absorption within optical elements, switchable polarization of light polarizers, or other switching technologies. An exemplary "wink-blink detection" switching technology can be included in telescopic contact lens (1600), in which internal or conformal shutters can be positioned over or within the central and annular apertures. Switch (1606) can be powered by photovoltaic (PV) cells or a radio frequency (RF) source that can cover the exterior of eyeglasses (1620).

In one aspect of the switching mechanism, switch (1606) can include PV cells that can be user-controlled by winking or patterned blinking. For example, a wink detection scheme can include a toggle between different states of aperture shutter closure (blocking light from entering the aperture), e.g., toggle between normal visual mode, telescopic visual mode, superimposed normal and telescopic visual mode, or various combinations of these modes. Electrical energy provided to the switch (1606) can be interrupted briefly each time the user shuts his/her eyelid, e.g., when light signal on light detector (1608) is interrupted. Logic can be integrated into the switch (1606) to recognize such an interruption, be it a brief interruption or sequence of interruptions. It is understood that the temporal duration of a blink, which is an involuntary eyelid movement, is substantially different than that of a wink, which is a voluntary eyelid movement. Therefore, voluntary user control can be configured in logic cells (e.g., using PV cells) in switch (1606) to switch between telescopic and normal visual modes.

FIG. 16D shows an exemplary timing diagram of "wink" control. In this example, a user can wear one telescopic contact lens (1600) in each eye, which can be initially operated in normal visual mode. The user can also wear eyeglasses (1620). Light is emitted from light emitter (1640) toward the switch (1606), which maintains the current state of visual mode. When the user blinks at a time (t1), the PD monitoring the state of both eyes would indicate a brief signal interruption, which is characteristic of an involuntary blink, and so switch (1606) would not alter the visual mode of either the left eye or right eye telescopic contact lens (1600), as configured in the logic of switch (1606). In this case, the light emitted from light emitter (1640) was blocked for a time duration substantially equivalent to that of a blink. The time duration of electrical interruption in switch (1606) caused by the blink can be configured in the logic of switch (1606) to maintain the current state of the shutters. Later, at time (t2), the user can voluntarily decide to wink his/her left eye. In this case, the light detected by the PD monitoring the corresponding eye would be interrupted, while the light detected by the other PD would not be interrupted, which is characteristic of a voluntary wink. The electrical interruption generated by the wink can be configured in the logic of switch (1606) to change the state of the shutters. In this example, the wink at time (t2) can switch the telescopic contact lens (1600) into telescopic visual mode, in which the shutter covering the central aperture (1602) can be configured to reflect or absorb light and not pass light through, while the outer annular aperture (1603) can be configured to pass light through.

Similarly, the switch logic can be configured to discriminate between voluntary actions based on a sequence or duration of some combination of voluntary eye actions.

Figure 17:
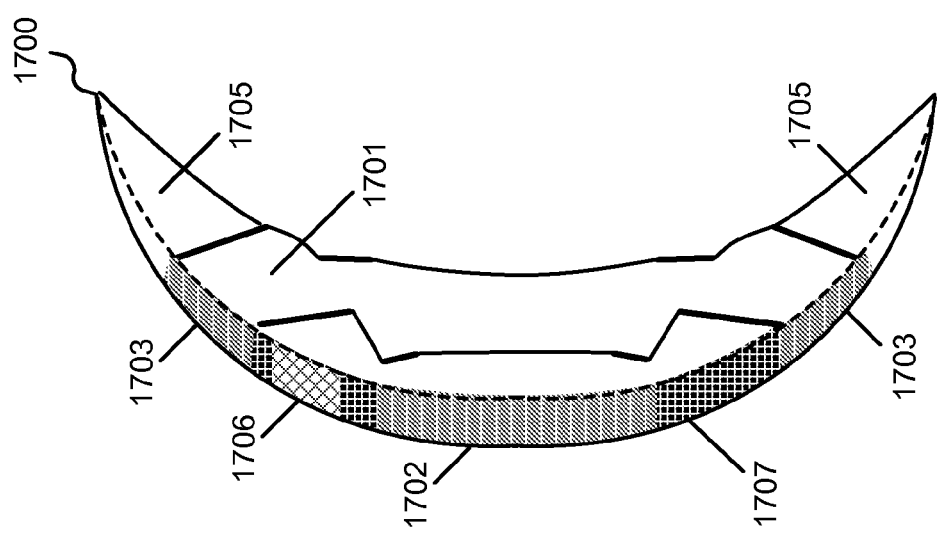
FIG. 17 shows an exemplary telescopic contact lens with photovoltaic cells and an internal control switch.

FIG. 17 shows a switching design that is internal to the contact lens where switching states between normal and telescopic visual modes of an exemplary telescopic contact lens can be implemented with photovoltaic cells and control switch encompassed within the telescopic contact lens. An exemplary telescopic contact lens (1700) can include an internal control switch (1706) that can switch between the central aperture (1702) and outer annular aperture (1703), e.g., rapidly switching between normal and telescopic vision. Control switch (1706) can be located along the interior region of telescopic contact lens (1700), e.g., between the two optical apertures above the fold mirrors of the optical region (1701). Telescopic contact lens (1700) can also include a soft, biocompatible outer lens that can encase optic elements and other components of telescopic contact lens (1700). The exemplary telescopic contact lens (1700) in FIG. 17 includes four concentric aspheric reflectors such that the optic is configured as a 4-folded lens, but other configurations can be incorporated into telescopic contact lens (1700), e.g., as a 6-folded lens, with TIR mirror DOEs, etc. Switch (1706) can include one or more switching technologies.

An exemplary "wink-blink detection" switching technology can be included in telescopic contact lens (1700), in which optic (1701) can include spatially shaped, conformal shutters over its apertures. Various implementations of the shutter can be implemented, which can include using light-absorptive electrochromic shutters, liquid crystals, and/or light-reflecting electrochromic shutters (e.g., electro reflective electrochromic switchable mirrors). Shutters can be shaped to match the area and dimensions of the central and outer annular apertures to provide for full or partial coverage. Shutters can be configured to allow for complete blocking of light rays in normal and/or telescopic visual modes (e.g., fully opaque) or varying degrees of translucence, e.g., ranging between 0% transparency to 100% transparency. Switch (1706) can be powered by photovoltaic (PV) cells or a radio frequency (RF) source that can cover the exterior of telescopic contact lens (1700).

In one aspect of the switching mechanism, telescopic contact lens (1700) can include PV cells (1707) that provide a light detecting medium/sensor that can be interfaced with switch (1706) that can be distinguish user-controlled by winking or patterned blinking from involuntary blinking, providing control over normal and telescopic visual mode switching. For example, a wink detection scheme can include a toggle between different states of aperture shutter closure (blocking light from entering the aperture), e.g., toggle between normal visual mode, telescopic visual mode, superimposed normal and telescopic visual mode, or various combinations of these modes. Electrical energy generated by the PV cell (1707) (e.g., electrical current in a PV cell switch control) can be interrupted briefly each time the user shuts his/her eyelid. Logic can be integrated into the PV cell switch (1706) to recognize such an interruption, be it a brief interruption or sequence of interruptions.

An exemplary "wink-blink detection" scheme for visual mode switching using the exemplary telescopic contact lens (1700) can be described similar to that in FIG. 16D. In the example described in FIG. 16D, a user can wear one telescopic contact lens, e.g., telescopic contact lens (1700), in each eye. Telescopic contact lens (1700) can be initially operated in normal visual mode, in this example. Light that can enter the user's eyes can be substantially continuous, thereby providing a constant light source to the PV cells (1707). Switch (1606) can maintain the current state of visual mode with the constant source of light. When the user blinks at a time (t1), switch (1706) would not alter the visual mode of either the left eye or right eye telescopic contact lens (1700), as configured in the logic of switch (1706). In this case, the light was blocked for a time duration substantially equivalent to that of a blink. The time duration of electrical interruption in switch (1706) caused by the blink can be configured in the logic of switch (1706) to maintain the current state of the shutters. Later, at time (t2), the user can voluntarily decide to wink his/her left eye. In this case, the light was blocked for a substantially longer time duration than that of a blink. The electrical interruption generated by the wink can be configured in the logic of switch (1706) to change the state of the shutters. In this example, the wink at time (t2) can switch the telescopic contact lens (1700) into telescopic visual mode, in which the shutter covering the central aperture (1702) can be configured to reflect or absorb light and not pass light through, while the outer annular aperture (1703) can be configured to pass light through.

The exemplary switching mechanism of telescopic contact lens (1700) can be powered by PV cells (1707) that convert light not transmitted through either aperture (e.g., central aperture (1702) and annular aperture (1703)) into electrical energy used to power switch (1706) to control the aperture shutters. In some cases, such ambient light may not be sufficient to power the switching mechanism of exemplary telescopic contact (1700), e.g., in a dim room or at night. In such cases conventional eyeglasses can be configured with an RF signal transmitter to transmit an RF signal to telescopic contact lens (1700). Telescopic contact lens (1700) can include an RF signal sensor that can be located anywhere within telescopic contact lens (1700) that does not disrupt the optical path of light in any visual modes. For example, the RF signal sensor can be embedded into the outer lens (1705). In the exemplary case that telescopic contact lens (1700) comprises opaque reflectors (e.g., concentric aspheric reflectors), then the RF signal sensor can be positioned in the region between the central aperture (1702) and the annular aperture (1703).

In some aspects, the RF signal transmitter/sensor power module can be the sole source of power to supply switching control mechanisms internal to an exemplary telescopic contact lens. In other aspects, photovoltaic and other light energy conversion modules can be the sole source of power to supply switching control mechanisms internal to an exemplary telescopic contact lens. In other aspects, a combination of RF signal and light energy power modules can be used to supply power to the internal switching control mechanisms of an exemplary telescopic contact lens.

Figure 18:
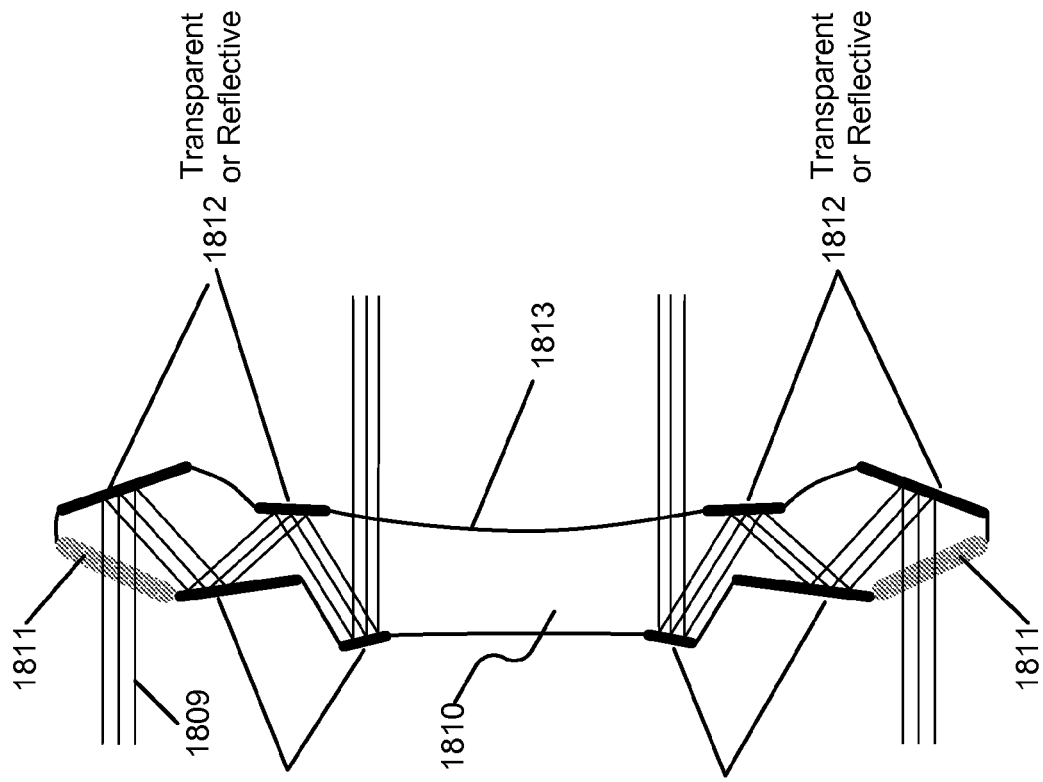
FIG. 18 shows an exemplary telescopic contact lens with controllable transparent or reflective optical elements.

FIG. 18 shows an exemplary optical lens (1810) with controllable transparent or reflective optical elements. Optical lens (1810) can be configured with electrochromic switchable mirrors (1812), which can variably reflect light or permit light to transfer through it based on control. For example, switchable control of the electrochromic switchable mirrors (1812) can be provided by a switching logic, e.g., from switch (1606) or switch (1707) when implemented in telescopic contact lens (1600) or telescopic contact lens (1700), respectively. Additionally, optical lens (1810) can include transmissive DOEs (1811) over the apertures (e.g., the outer annular aperture) to reduce chromatic aberrations of light.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few implementations and examples are described and other implementations, enhancements and variations can be made based on what is described and illustrated in this patent document.

We claim:

1. A contact lens, comprising:
a lens assembly structured to include a central aperture formed of a material capable of transmitting light through the central aperture to enter an eye behind the lens assembly as a first optical imaging device for forming images in the eye, an annular aperture separated from and enclosing the central aperture to receive light outside the central aperture, and an annular optical element coupled to the annular aperture to receive light from the annular aperture and to guide the received light along a folded optical path to enter the eye as a second optical imaging device for forming images in the eye that are optically different from images formed through the central aperture; and
a soft lens skirt formed outside the lens assembly to form contact with the eye.

2. The lens as in claim 1, comprising:
an aperture control mechanism that operates one of the central aperture and the annular aperture to receive light for forming images in the eye while shutting down the other one of the central aperture and the annular aperture not to receive light.

3. The lens as in claim 2, comprising:
a central aperture shutter that is controlled by the aperture control mechanism to shut or open the central aperture; and
an annular aperture shutter that is controlled by the aperture control mechanism to shut or open the annular aperture.

4. The lens as in claim 3, wherein:
the central aperture shutter or the annular aperture shutter includes a spatial light modulator.

5. The lens as in claim 3, wherein:
the central aperture shutter or the annular aperture shutter includes a photochromic shutter.

6. The lens as in claim 3, wherein:
the central aperture shutter or the annular aperture shutter includes a liquid crystal switch.

7. The lens as in claim 3, comprising:
a power source formed in the lens assembly to supply power to the central aperture shutter and the annular aperture shutter.

8. The lens as in claim 7, comprising:
a blink-recognition element formed in the lens assembly to detect a blink of the eye, wherein the aperture control mechanism is coupled to the blink-recognition element to control, based on detected blinks, the central aperture shutter and the annular aperture shutter.

9. The lens as in claim 7, wherein:
the power source is located in an area between the central aperture and the annular aperture.

10. The lens as in claim 1, wherein:
the annular optical element includes optical diffractive elements concentrically located in the annular optical element to form the folded optical path at each location on the annular optical element.

11. The lens as in claim 1, wherein:
the annular optical element includes optical reflectors concentrically located in the annular optical element to form the folded optical path at each location on the annular optical element.

12. The lens as in claim 1, wherein:
the annular optical element includes optical reflective and diffractive elements concentrically located in the annular optical element to form the folded optical path at each location on the annular optical element.

13. The lens as in claim 1, wherein:
the annular aperture and the annular optical element form a telescope to magnify images formed in the eye to be greater than images formed through the central aperture.

14. The lens as in claim 1, wherein:
an eyeglasses that guides light transmission into the lens includes a polarized lens assembly structured to include a polarized lens of a particular polarization made of a switchable polarizing material and a polarization control mechanism coupled to the polarized lens that controls an orientation of the particular polarization of the polarized lens, and
the lens further comprising a central aperture polarizer that is of a first polarization and an annular aperture polarizer that is of a second polarization,
wherein the polarized assembly lens filters light to guide the light to the central aperture or the annular aperture of the lens.

15. The lens as in claim 14, wherein:
the polarization control mechanism determines the particular polarization to match the first polarization or the second polarization.

16. The lens as in claim 15, wherein:
the particular polarization is orthogonal to the first polarization, thereby blocking light from transmitting through the central aperture.

17. The lens as in claim 15, wherein:
the particular polarization is orthogonal to the second polarization, thereby blocking light from transmitting through the annular aperture.

18. The lens as in claim 14, wherein:
the switchable polarizing material includes at least one of liquid crystals, elecro-absorptive electrochromic material, and electro-reflective electrochromic mirrors.

19. The lens as in claim 1, wherein:
an eyeglasses that guides light transmission into the lens includes a polarized lens assembly structured to include a polarized lens of a particular polarization, and
the lens further comprising a central aperture polarizer made of a switchable polarizing material that is of a first polarization, an annular aperture polarizer made of a switchable polarizing material that is of a second polarization, and an aperture control mechanism coupled to the central aperture polarizer and the annular aperture polarizer that controls an orientation of at least one of the first polarization and the second polarization,
wherein the polarized assembly lens filters light to guide the light to the central aperture or the annular aperture of the lens at the particular polarization.

20. The lens as in claim 19, wherein:
the aperture control mechanism determines the first polarization to match the particular polarization of the polarized lens and the second polarization to be orthogonal to the particular polarization of the polarized lens, thereby blocking light from transmitting through the annular aperture.

21. The lens as in claim 20, wherein:
the aperture control mechanism determines the second polarization to match the particular polarization of the polarized lens and the first polarization to be orthogonal to the particular polarization of the polarized lens, thereby blocking light from transmitting through the central aperture.

22. The lens as in claim 19, wherein:
the switchable polarizing material includes at least one of liquid crystals, elecro-absorptive electrochromic material, and electro-reflective electrochromic mirrors.

23. A method for using a contact lens to form images in an eye, comprising:
using a central aperture of the contact lens as a first optical imaging device to form images in the eye in a first vision;
using an annular aperture of the contact lens, that is separated from and encloses the central aperture, to receive light outside the central aperture, to guide the received light along a folded optical path to enter the eye as a second optical imaging device to form images in the eye in a second vision that is optically different from the first vision; and
switching on and off the central aperture and the annular aperture, one aperture at a time, to form images in the first and second visions in the eye.

24. The method as in claim 23, wherein the first vision and second vision have different image magnifications.

25. The method as in claim 23, wherein the second vision is a telescope vision.

26. A contact lens, comprising:
a lens assembly structured to include a central aperture formed of a material capable of transmitting light through the central aperture to enter an eye behind the lens assembly as a first optical imaging device for forming images in the eye;
an annular aperture formed in the lens assembly, that is separated from and encloses the central aperture, to receive light outside the central aperture, and to guide the received light along a folded optical path to enter the eye as a second optical imaging device for forming images in the eye that are optically different from images formed through the central aperture;
a central aperture shutter that shuts or opens the central aperture;
an annular aperture shutter that shuts or opens the annular aperture; and
an aperture control that operates one of the central aperture and the annular aperture to receive light for forming images in the eye while shutting down the other one of the central aperture and the annular aperture not to receive light.

27. The lens as in claim 26, comprising:
a power source formed in the lens assembly to supply power for operating the contact lens.

28. The lens as in claim 27, comprising:
a blink-recognition element formed in the lens assembly to detect a blink of the eye, wherein the aperture control is coupled to the blink-recognition element to control, based on detected blinks, the central aperture shutter and the annular aperture shutter.

29. The lens as in claim 27, wherein:
the power source is located in an area between the central aperture and the annular aperture.

30. The lens as in claim 27, wherein:
the power source is a photovoltaic power source that converts light into electrical power.

31. The lens as in claim 27, comprising:
a wink-recognition element formed in the lens assembly to detect a wink of the eye, wherein the aperture control is coupled to the wink-recognition element to control, based on detected winks, the central aperture shutter and the annular aperture shutter.

32. A contact lens, comprising:
an inner lens including two or more optical apertures and optical reflectors, wherein the two or more optical apertures include a central optical aperture located in the center of the inner lens that receives light and directs received light onto a central region of a retina of an eye for normal vision and an annular optical aperture located on a periphery of the inner lens that receives light and directs received light along a folded optical path formed by the optical reflectors to magnify an image in the received light onto a peripheral region of the retina for a telescopic vision, and wherein the optical reflectors are arranged in a region between the annular optical aperture and the central optical aperture to reflect the received light from one reflector to another along the folded optical path that is separated from an optical path of the received light from the central optical aperture; and
a switching device that is located on the exterior of the inner lens between the two or more optical apertures that switches between normal and telescopic vision.

33. The contact lens of claim 32, wherein the two or more optical apertures are concentric.

34. The contact lens of claim 32, wherein the plurality of aspheric reflectors are concentric.

35. The contact lens of claim 32, wherein the switching device comprises a conformal spatial light modulator.

36. The contact lens of claim 35, wherein the conformal spatial light modulator comprises at least one of a photochromic shutter, electrochromic shutter, and a liquid crystal switch.

37. The contact lens of claim 35, wherein the switching device is powered and controlled using light and photovoltaic cells.

38. The contact lens of claim 32, wherein the inner lens further includes diffractive optical elements (DOE) to control chromatic aberrations.

39. A contact lens, comprising:
- a lens assembly structured to include a single annular optical aperture located on a periphery of the lens assembly that receives light and guides received light along a folded optical path formed by optical reflectors to magnify an image in the received light onto a region of retina of an eye for a telescopic vision, and wherein the optical reflectors are arranged in a region that is hollow between the annular optical aperture and the center of the lens assembly to reflect the received light from one optical reflector to another along the folded optical path; and
- a soft lens skirt formed outside the lens assembly to form contact with the eye, wherein the lens assembly is made of the same material as the soft lens skirt.

40. A contact lens, comprising:
concentric reflective optical surfaces that provide a vision path through an annular input aperture, wherein the concentric reflective optical surfaces are internal surfaces to a smooth outer structure, and wherein the concentric reflective surfaces lie on a first material embedded within a second material, and wherein the combination of reflections and refractions through the first and second materials provide a substantially color independent visual magnification.

41. A contact lens, comprising:
concentric reflective optical surfaces that provide a vision path through an annular input aperture, wherein the concentric reflective optical surfaces are internal surfaces to a smooth outer structure, and wherein the concentric reflective optical surfaces lie on the internal surfaces of a substantially hollow volume within the smooth outer structure, and wherein the combination of refractive and reflective surfaces provide a substantially color independent visual magnification.

* * * * *